(12) United States Patent
Tomita et al.

(10) Patent No.: US 7,880,919 B2
(45) Date of Patent: Feb. 1, 2011

(54) IMAGE PROCESSING APPARATUS AND METHOD

(75) Inventors: Makoto Tomita, Kawasaki (JP); Koji Nakagiri, Kawasaki (JP); Yasuo Mori, Yokohama (JP); Junko Sato, Kawasaki (JP); Wataru Kanaya, Chofu (JP); Michiko Kanaya, legal representative, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1264 days.

(21) Appl. No.: 11/105,547

(22) Filed: Apr. 14, 2005

(65) Prior Publication Data

US 2005/0237573 A1    Oct. 27, 2005

(30) Foreign Application Priority Data

Apr. 16, 2004   (JP)   ............................. 2004-122289

(51) Int. Cl.
- G06K 15/00 (2006.01)
- G06K 9/36 (2006.01)
- G06F 3/12 (2006.01)

(52) U.S. Cl. ................. 358/1.18; 358/1.1; 358/1.12; 358/1.13; 358/1.9; 715/204; 382/287; 382/291; 382/294

(58) Field of Classification Search ................. 715/204; 358/1.2, 1.18, 452; 382/287, 291, 294
See application file for complete search history.

(56) References Cited

U.S. PATENT DOCUMENTS

| | | | |
|---|---|---|---|
| 5,398,289 A | 3/1995 | Rourke et al. | 382/1 |
| 5,680,198 A | 10/1997 | Ohnishi | 355/23 |
| 6,501,562 B1 | 12/2002 | Nakagiri et al. | 358/1.2 |
| 6,594,033 B1 | 7/2003 | Kujirai et al. | 358/1.18 |
| 6,654,509 B2 | 11/2003 | Nishikawa et al. | 382/298 |
| 6,961,069 B2 * | 11/2005 | Hashimoto | 345/629 |
| 7,177,045 B2 * | 2/2007 | Goel et al. | 358/1.18 |
| 7,342,695 B2 * | 3/2008 | Matsugi | 358/531 |
| 2002/0060675 A1 | 5/2002 | Hashimoto | 345/204 |
| 2002/0067508 A1 | 6/2002 | Nishikawa et al. | 358/1.18 |
| 2003/0056176 A1 | 3/2003 | Tanaka et al. | 715/522 |
| 2004/0066532 A1 | 4/2004 | Matsugi | 358/1.15 |

FOREIGN PATENT DOCUMENTS

| | | |
|---|---|---|
| JP | 6-181516 | 6/1994 |
| JP | 2000-224400 | 8/2000 |
| JP | 2001-197292 | 7/2001 |

(Continued)

OTHER PUBLICATIONS

Japanese Official Action dated Sep. 29, 2008, regarding Application No. 2004-122289.

*Primary Examiner*—King Y Poon
*Assistant Examiner*—Lawrence E Wills
(74) *Attorney, Agent, or Firm*—Fitzpatrick, Cella, Harper & Scinto

(57) ABSTRACT

An image processing apparatus enabling identical editing of a plurality of edit target images includes an edit position designator for designating, for a single image, an edit position as an edit target, an alignment position designator for designating an image alignment position and a edit unit that aligns an edit image and edits a designated area having the edit position for the single image as its reference.

9 Claims, 23 Drawing Sheets

FOREIGN PATENT DOCUMENTS

| | | |
|---|---|---|
| JP | 2002-136482 | 5/2002 |
| JP | 2002-158851 | 5/2002 |
| JP | 2002-205440 | 7/2002 |
| JP | 2003-101748 | 4/2003 |
| JP | 2003-162407 | 6/2003 |
| JP | 2004-32047 | 1/2004 |
| JP | 2004-80744 | 3/2004 |
| KR | 2003-0093020 | 12/2003 |

* cited by examiner

IMAGE PROCESSING APPARATUS AND METHOD

FIELD OF THE INVENTION

This invention relates to an image processing apparatus and method for implementing a specific process with respect to a plurality of images, for example.

BACKGROUND OF THE INVENTION

Conventionally, a process of scanning a paper document with a scanner and processing the scanned image data at a host computer is generally carried out. In this type of process, the scanned image data is input to a host computer. A user retouches the input image data using an image editing application or the like. Furthermore, the user then adds to the retouched image data such processing instructions as double-sided, staple, hole punch, etc., as necessary using a printer driver, and outputs the data from a printing device. In addition, when printing a data file handled by an ordinary application, it is possible to perform a variety of print settings using the printer driver. Instructions to punch, staple and so forth are carried out in units of documents. Accordingly, in recent years the development of a make-ready application for preparing printing has progressed.

In a printing system shown in Japanese Laid-Open Patent Publication (Kokai) No. 2003-162407, through a bookbinding application on an image processing apparatus, printing can be managed in levels of a document, a book, a chapter or a page, and furthermore, it is possible to carry out print settings on the bookbinding application. In the bookbinding application, print settings for carrying out settings for the entire book and print settings that can be set at each level are provided. For example, in a post process such as finishing, staple, punch or the like, the processing of additional information such as a watermark, a header/footer or the like can be set in chapter units or in page units.

With the make-ready application, the original document data is limited to application data and image data as described in Japanese Laid-Open Patent Publication (Kokai) No. 2003-162407. By contrast, however, a make-ready application that can accommodate a paper document is desired. In other words, conventionally, the user edits image objects of staple and punch-hole in image data obtained by scanning a paper document with a scanner manually. In recent make-ready applications, an arrangement is provided in which a scanned staple or punch-hole image object is easily deleted.

A paper document is commonly composed of multiple pages. To manually image-edit each page of a scanned plurality of image data would impose a major burden on the user. Consequently, an image editing process carried out on a given page (the contents of the editing or the position on the image data to be edited) could be stored and that image editing process executed repeatedly for a plurality of pages.

However, ordering a retouch of one image and repeating the same retouch of a plurality of images cannot be carried out in a case in which the sizes of the respective images are different. For example, although an image of the same size as the one image for which a retouch has been ordered can be retouched, it is likely that retouching an image of a different size would be difficult. Consequently, retouching must be carried out after selecting images of the same size and reformulating them into groups targeted for image processing. In this case, separate image processing operations must be repeated for as many types of image sizes as are present, and there is a risk that productivity of the work of retouching images will cease to improve.

In addition, with the conventional retouch method, each image is processed by using a coordinate origin fixed in place on the image data as a reference and aligning the position of the image to be processed with reference to that origin. For example, with an image obtained by scanning both sides of a loose-leaf type paper document bound by a binder, the binder holes appear to the left and the right alternately according to the order of scanning. In order to implement an image process that removes the binder holes from this type of image, it is necessary to change the position of the hole to be erased with every page. However, with the conventional retouching method, image processing that depends on the direction of binding could not be performed. As a result, it is necessary to select the image with the binder holes on the same side and to create a group of images, and either erase the binder holes in each group or perform image processing separately on each image. When the position that is targeted for retouching changes with each image, prior to retouch, each image in which the position to be retouched is the same must be sorted into, for example, the same folder, and hence operability is not good.

In addition, when designating the position to be retouched, the position at which the retouch operation is to be applied is determined while referencing one specific image. As a result, in another image to which retouching is applied, it cannot be confirmed in advance whether or not the retouch position is correct. Accordingly, it is often the case that unintended retouching results, requiring that the whole operation be done again.

SUMMARY OF THE INVENTION

Accordingly, the present invention is conceived in light of the foregoing conventional example, and has as an object to provide an image processing apparatus and method that provide a retouch process that targets a variety of different images that is quick, easy, and verifiable in advance, with high productivity.

A more specific object of the present invention is to provide an image processing apparatus and method that provide the ability to implement the same retouch for multiple images of different sizes and retouch target positions.

In addition, the present invention has as an object to provide an image processing apparatus and method that enables the retouch position and range to be confirmed in advance with each image to be retouched.

In order to achieve the above-described objects, according to one aspect of the invention there is provided an image processing apparatus enabling identical retouching of a plurality of retouch target images, the apparatus comprising:

a retouch position designator for designating, for a single image, a retouch position as a retouch target;

an alignment position designator for designating an image alignment position; and a retouch unit that aligns a retouch image and retouches a designated range having the retouch position for the single image as its reference.

The present invention provides a retouch process that targets a variety of different images that is quick, easy, and verifiable in advance, with high productivity. Furthermore, the present invention provides the ability to implement the same retouch for a plurality of images of different sizes and retouch target positions. In addition, the present invention enables the retouch position and range to be confirmed in advance with each image to be retouched.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will now be described in detail in accordance with the accompanying drawings.

(Sample Software Configuration of an Image Processing System According to the Present Embodiment)

Figure 1:
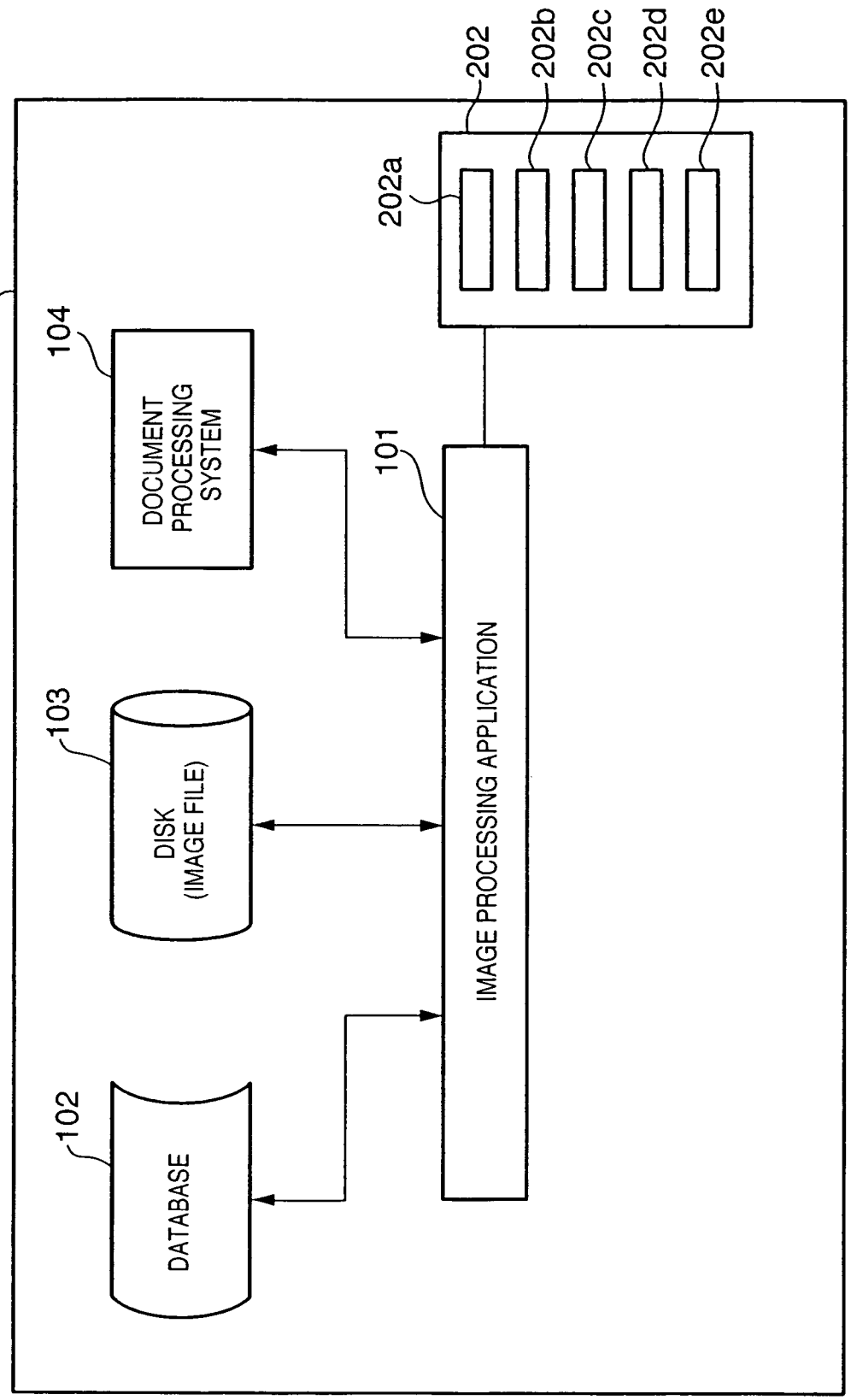
FIG. 1 is a diagram showing an example of a software configuration of an image processing system according to an embodiment of the present invention.

FIG. 1 is a diagram showing an example of a software configuration of an image processing system according to an embodiment of the present invention. An image processing system (image processing apparatus) of the present invention is implemented by a digital computer 100 (hereinafter also called a host computer) that is a preferred embodiment of the present invention. The image processing system of the present invention performs image processing on a plurality of image data, and the method of recording of the plurality of image data is not particularly significant. If the form is such as to permit page order management, then a configuration in which the image data is read from a database 102, an image processing application 101 processes image data corresponding to each of the plurality of images (hereinafter called a plurality of image data) and the image data is again saved in the database, is also possible, as is a configuration in which an image file is read directly from a disk 103 and a plurality of images processed and saved. In addition, it is also possible to have a configuration in which a printed document is read from a document processing system 104 and a plurality of images processed and saved, in which the printed document is page-managed and the output format regularized.

It should be noted that the image data read from the disk 103, the database 102 or the document processing system 104 is saved in such a way that there is one image data file for image data corresponding to one image. The image processing application 101 of the present embodiment handles a previously designated image data file as the image data file that is the target of a retouch to be described later. As the method of designation, there is a method that designates a specific folder, for example. In that case, the image data file stored in the designated folder on the disk 103 becomes the retouch target (as will be described later with respect to FIG. 3 and the like, an image data file to which retouch is to be applied further designated from therewithin). In addition, an image data file hit when searching the database 102 using a specific condition can also be designated as a target. Moreover, an image data file that the document processing system 104 outputs as a single document can also be a target for image-processing (e.g., retouching).

These retouch target image data files are ordered according to a specific rule. For example, assume that image data held in a specific folder is scanned from an image scanner. Image data (for example 1 page) read by a single scan operation composes a single image data file. In this case, a file name indicating the order in which the image data is scanned by the image scanner is given to each image data file. For example, this type of file name can be given to each image data file during image scanning by an application program having an image scanning function executed by a host computer that controls the image scanner. Of course, the order is not limited to the file name. The ordering may be done by a time stamp recorded as a file attribute, or in accordance with an order determined by the structure of the document data that the document processing system 104 outputs.

(Sample Hardware Configuration of an Image Processing System According to the Present Embodiment)

Figure 2:
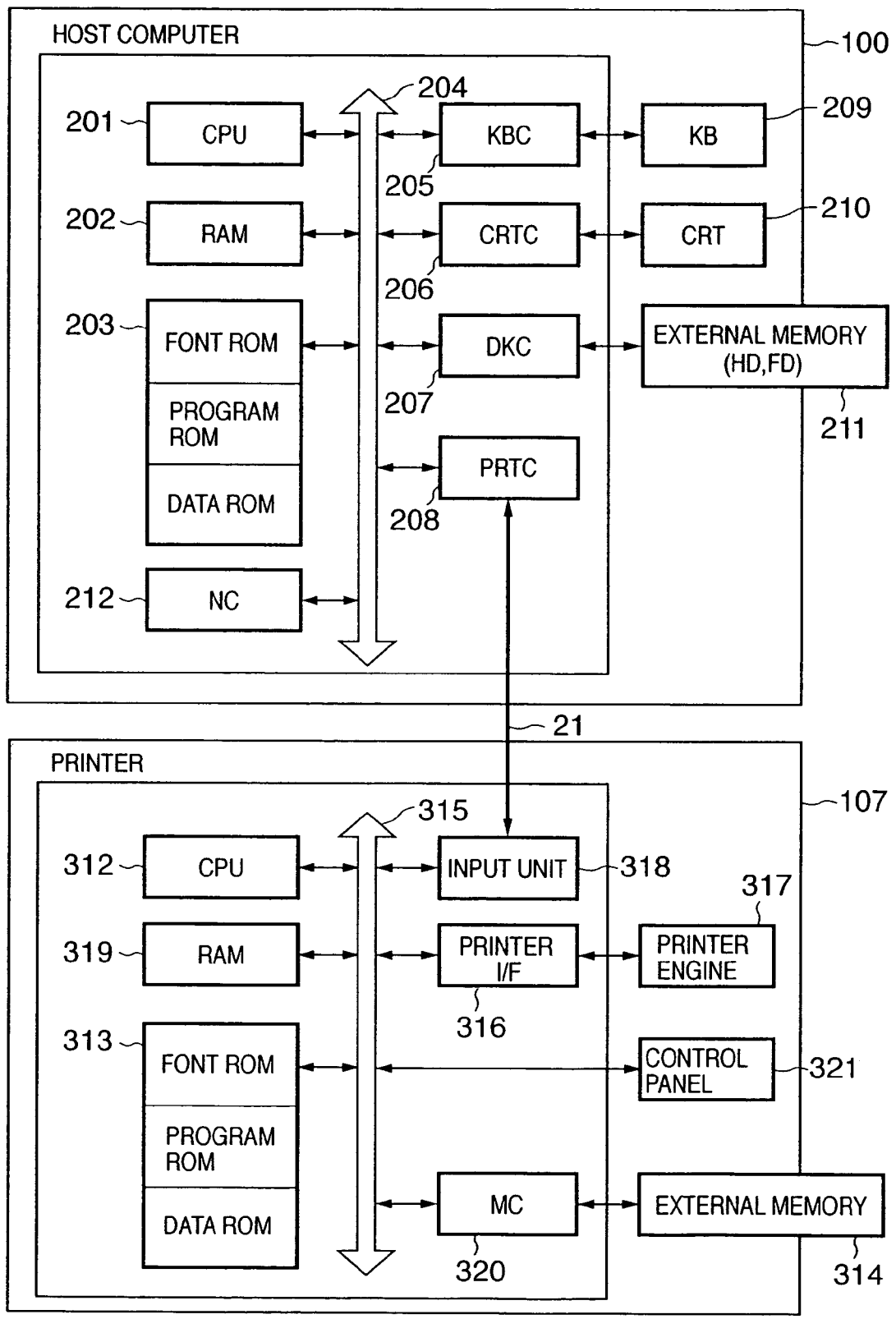
FIG. 2 is a block diagram showing an example of a hardware configuration of an image processing system according to an embodiment of the present invention.

FIG. 2 is a block diagram showing an example of a hardware configuration of an image processing system according to an embodiment of the present invention. In FIG. 2, the host computer 100 is comprised of a CPU 201 that executes multiple image processing based on an image processing program or the like stored on a program ROM in a ROM 203 or in an external memory 211. The CPU 201 comprehensively controls all the devices connected to a system bus 204. In addition, on the program ROM in the ROM 203 or in the external memory 211 is stored an operating system (OS) program and the like that is the control program for the CPU 201. On a font ROM in the ROM 203 or in the external memory 211 is stored font data and the like used when performing the aforementioned image processing. On a data ROM in the ROM 203 or in the external memory 211 is stored a variety of data used when performing the aforementioned image processing and the like. A RAM 202 functions as the CPU 201 main memory, work area and so forth.

A keyboard controller (KBC) 205 controls key input from a keyboard 209 and a pointing device, not shown. A CRT controller (CRTC) controls a CRT display (CRT) 210 display. A disk controller (DKC) 207 controls access to the external memory 211 such as a hard disk (HD) or a floppy disk (FD). In the hard disk (HD) or floppy disk (FD) external memory 211 are stored a boot program and a variety of applications, font data, user files, editing files, a printer control command generator program (hereinafter "printer driver") and the like. A printer controller (PRTC) 208 is connected to a printer 107 through an interactive interface (interface) and controls communication with the printer 107.

The CPU 201 executes an outline font rasterize process to a display information RAM set on the RAM 202, for example, and enables WYSIWYG on the CRT 210. In addition, the CPU 201 opens a variety of windows registered on the basis of commands issued by a mouse cursor or the like, not shown, on the CRT 210, and executes a variety of data processes. When a user executes a print, the CPU 201 opens a window related to the print settings and enables the setting of a print process method for a printer driver, including selection of a print mode.

The printer 107 is controlled by a CPU 312. A printer CPU 312 outputs an image signal as output information to a print unit (printer engine) 317 connected to a system bus 315 based on a control program or the like stored on a control program ROM or the like stored in a program ROM in the ROM 313 or in an external memory 314. In addition, on the program ROM in the ROM 313 is stored a control program and the like for the CPU 312. On the font ROM in the ROM 313 is stored font data and the like used when generating the aforementioned output information. On the data ROM in the ROM 313 is stored information and the like used at the host computer 100 if the printer has no hard disk or other external memory 211.

The CPU 312 enables communication with the host computer through an input unit 318, and can relay information and the like in the printer to the host computer 100. A RAM 319 is a RAM that functions as the main memory, work area and so forth of the CPU 312, and is constructed so as to be able to expand memory capacity using an option RAM connected to an expansion port, not shown. It should be noted that the RAM 319 is used as an output information raster area, an environmental data storage area, an NVRAM and the like. Access to the aforementioned hard disk, IC card or other external memory 314 is controlled by a memory controller (MC) 20. The external memory 314 is connected as an option, and stores font data, emulation programs, form data and the like. Reference numeral 321 designates a control panel, upon which are arranged switches, LEDs and the like for operating the system.

In addition, the above-described external memory 211 is not limited to a single unit, and may instead constitute a plurality of units, and the system may be configured so as to be able to connect a plurality of external memories storing, in addition to internal fonts, programs that interpret printer control languages of different language systems and option cards. Furthermore, the external memory 211 may have an NVRAM, not shown, and store printer mode settings from the control panel 321.

Alternatively, a network instead of a local connection may connect the host computer 100 and the printer 107.

(Sample Processing Procedure of the Image Processing System According to the Present Embodiment)

Figure 3:
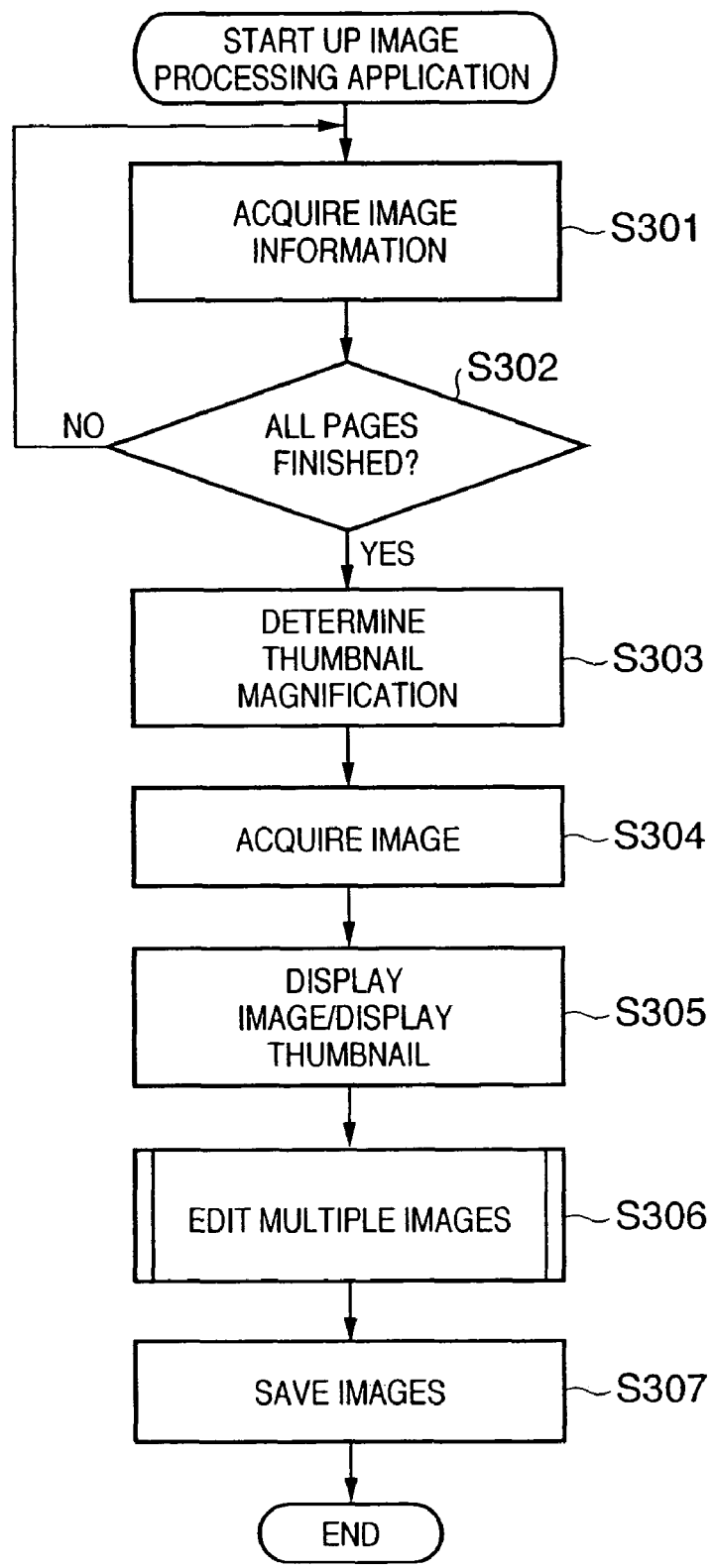
FIG. 3 is a flow chart illustrating an operating procedure for an image processing system in a case in which an image processing application is run for a plurality of images.
Figure 4:
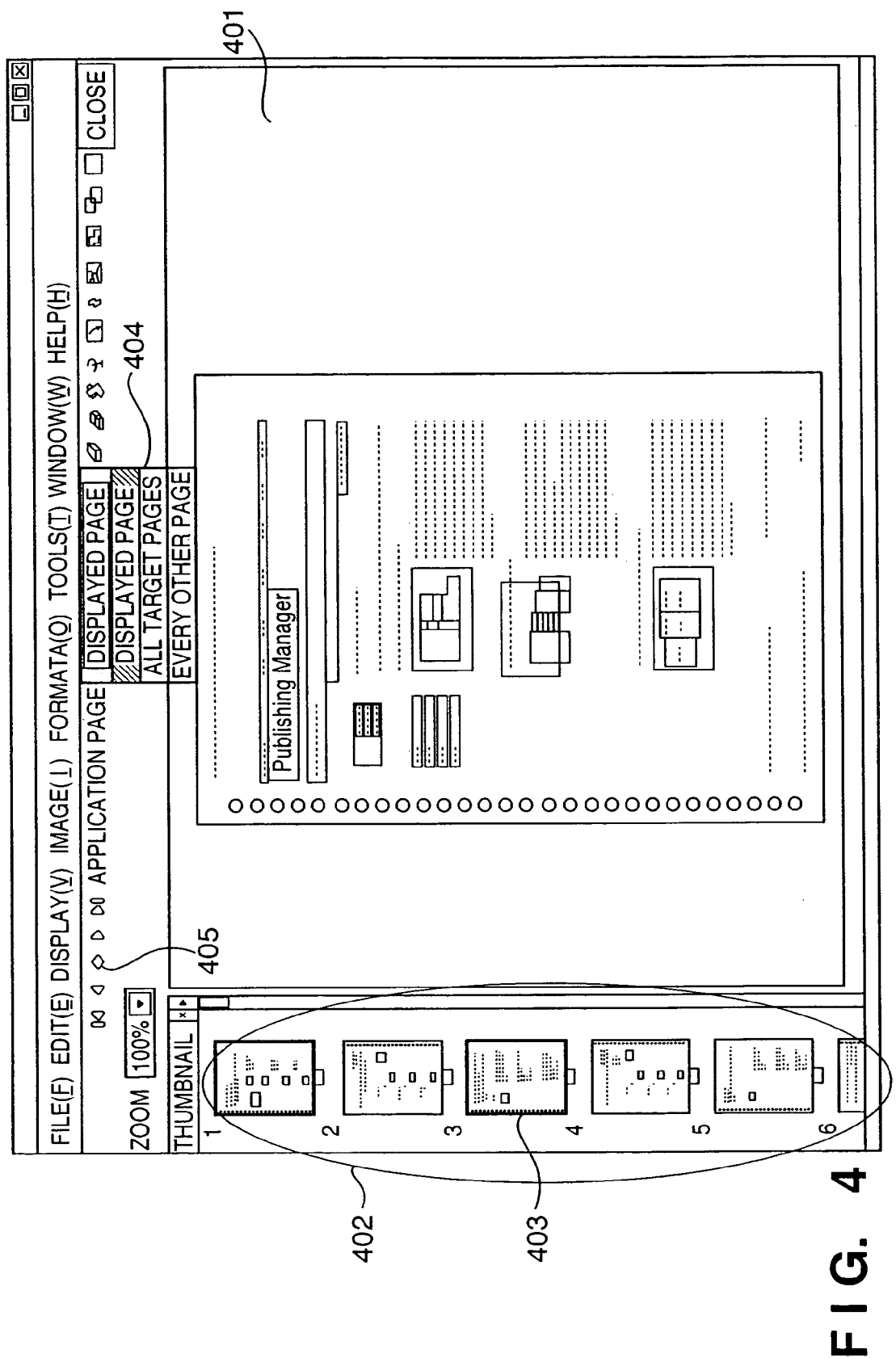
FIG. 4 is a diagram showing one example of a user interface of a multiple image processing application.

FIG. 3 is a flow chart illustrating an operating procedure of an image processing apparatus in a case in which the image processing application shown in FIG. 1 is running. In addition, FIG. 4 is a diagram showing one example of a user interface of the image processing application. Before proceeding with an image processing application, a description will first be given of a data area used mainly by the image processing application 101, with reference once more to FIG. 1. The image processing application 101 uses a memory 202. Target page designation information 202*a*, selected page information 202*b*, target page information 202*c*, alignment position designation information 202*d* and retouch position and area information 202*e* are contained in the memory 202.

The target page designation information 202*a* indicates whether (i) the image data file (page) that is the retouch application target is only the currently selected page, (ii) a page group consisting of every other page in accordance with the image data file (page) order, using the selected page as a reference, or (iii) all the pages contained in the target folder.

Selected page information showing the one page currently selected, for example the image data file name or the like, is stored in the selected page information 202*b*. For example, all image data file names to which retouching is to be applied are contained therein. However, the target page information 202*c* may be eliminated because it can be determined uniquely from the target page designation information and the selected page information. Nevertheless, in the present embodiment, it is included in the interest of improving processing efficiency.

Information that is to serve as a reference for positionally aligning the page to be retouched is stored in the alignment position designation information 202*d*. For example, information indication alignment positions such as upper left, lower left, upper right and lower right is included. The retouch position area information 202*e* is indicated by coordinates that use as a reference an origin (called a processing origin) that changes every time the alignment position designation information 202*d* changes. For example, if the alignment position is designated as upper left, then the retouch position is expressed by coordinate values that have as their processing origin the upper left corner of the image on the page that is currently selected. Then, once the retouch position is designated, even if the alignment position designation changes, the relative positions of the processing origin prior to the change in alignment position designation and the retouch position is maintained so long as the retouch position is not changed. In other words, once the processing origin is changed, the retouch position is converted into coordinates based on the post-change processing origin. For example, even if the alignment position designation is changed from upper left to lower right, there is no change in the relative positions of the retouch position designated when the alignment position designation was the upper left and the position corresponding to the upper left corner of the selected page at the time that the upper left was designated as the alignment position.

The image processing application 101 uses this type of storage area to carry out processing. Of course, other areas are also necessary, such as areas for rasterizing the image data files and areas for temporarily storing data during retouch, but since these are the same in an ordinary image processing application that does not have the functions of the present embodiment a description thereof is omitted here.

The process shown in FIG. 3 is commenced when the image processing application 101 is run. First, image information on a plurality of images targeted for processing is acquired (S301). The processing targets may, for example, be image data files gathered into a specific folder and put in order. Of course, the processing targets may be designated by other methods. The size of the image data files is held as additional information. Next, information on the size of the images in all of the image data files targeted for processing is acquired (S302). The magnification of the image display when displaying the thumbnail images is determined so that the image having the largest size among all the images for which size information is acquired becomes a thumbnail image of a previously determined fixed size and is stored in the memory (S303). Those images other than the largest image are also sized according to the magnification determined in step S303 and thumbnailed, and therefore, even as thumbnail images, the relative size ratios between images are kept at the same values as the original images.

Thereafter, the image data files targeted for processing are opened in order, and thumbnails are created in accordance with the determined magnification (thumbnail group 402 in FIG. 4) and displayed (S304). In addition, if there is an image data file designated when the image processing application 101 is started up, that image data is displayed in order to allow an operator or the like to designate the content of the retouching (S305, image 401 in FIG. 4). If there is no file so designated, then the lead image data is displayed. The designated image data thumbnail is displayed so as to be distinguishable from the other thumbnails by color or the like (thumbnail 403 in FIG. 4). Then, the retouch process is executed (S306) in response to the image editing work performed by the user, in particular the retouching of a plurality of images (S306). The retouched image data is then saved and the process terminates (S307).

FIG. 4 is a diagram showing a sample of that which is displayed in steps S305 and S306, and is a user interface screen of the image processing application 101. Thumbnails 402, 403 and image 401 are displayed by the procedure described above. Besides this, a page forward button 405 and a target page switch drop-down menu 404 are also included in the display screen frame. The following is a detailed description of FIG. 3, but it should be remembered that, in the following description, the image data is called a page.

(Multiple Image Editing Process)

Figure 5:
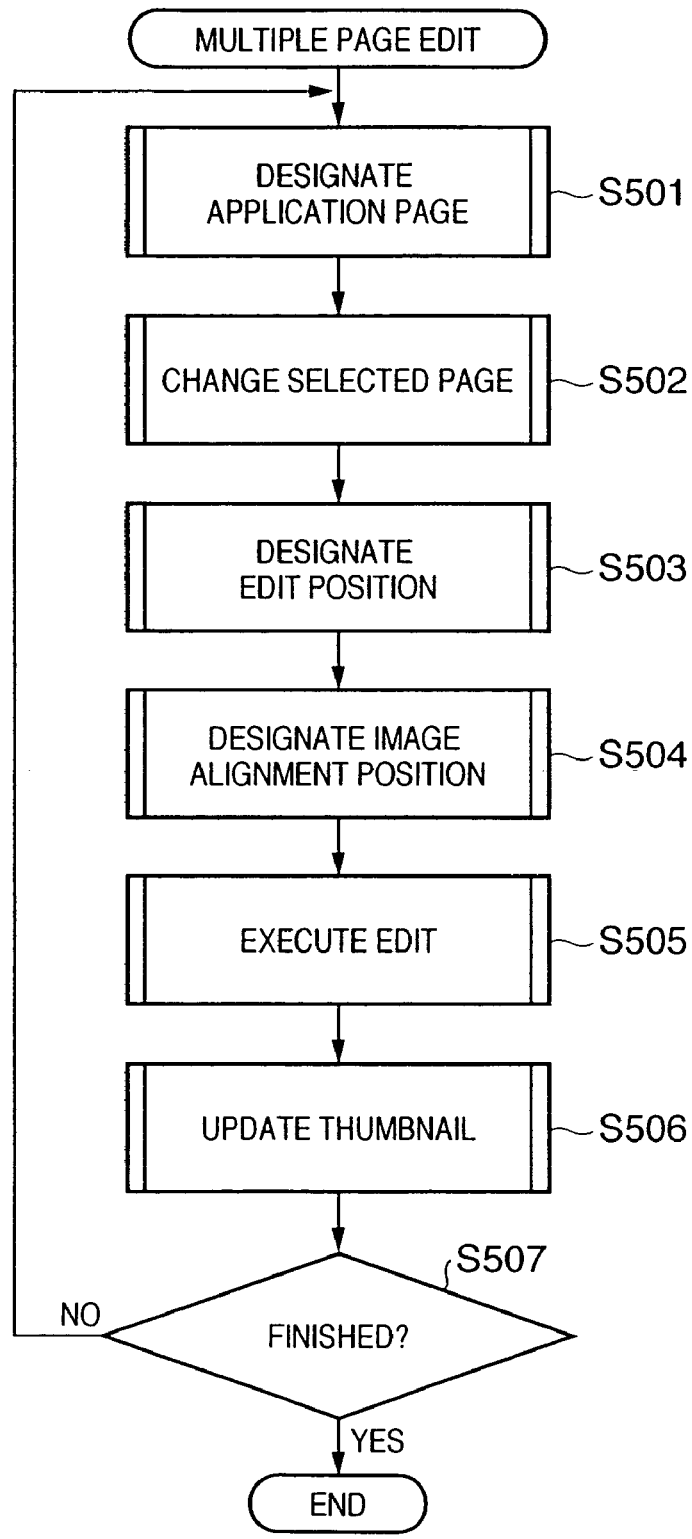
FIG. 5 is a flow chart illustrating details of an operating procedure for an image processing system during editing of a plurality of images.

FIG. 5 is a flow chart illustrating details of an operating procedure of the image processing application 101 in the image editing process of step S306 shown in FIG. 3. The editing of a plurality of images is implemented by a combination of the processes of designating the target page(s) to be edited (S501), changing the currently selected page (S502), designating the position and area of the retouch target in the selected page (S503), designating the image alignment position that designates the alignment position of each page (S504), retouching at the position and in the area designated for the targeted page(s) (S505), and updating the thumbnail displayed on the user interface (S506). Until the user specifically terminates processing using the user interface or the like (S507), the image processing application 101 awaits an instruction from the user. It should be noted that, of these processes, in those from step S501 to step S505 it is determined whether to execute or not in response to user choice, and therefore the step is not executed if there is no change in the item corresponding to that step. In other words, although in FIG. 5 the steps are arranged in series, such arrangement is for ease of depiction. In reality, it is not necessary that the steps be arranged in series. In this case, one of the steps S501-S505 is executed in response to a user operation and the next input is awaited. Only the thumbnail update of step S506 is arranged in series, insofar as it is always executed immediately after one of the steps S501-S505 is executed.

(Target Page Designation Process)

Figure 6:
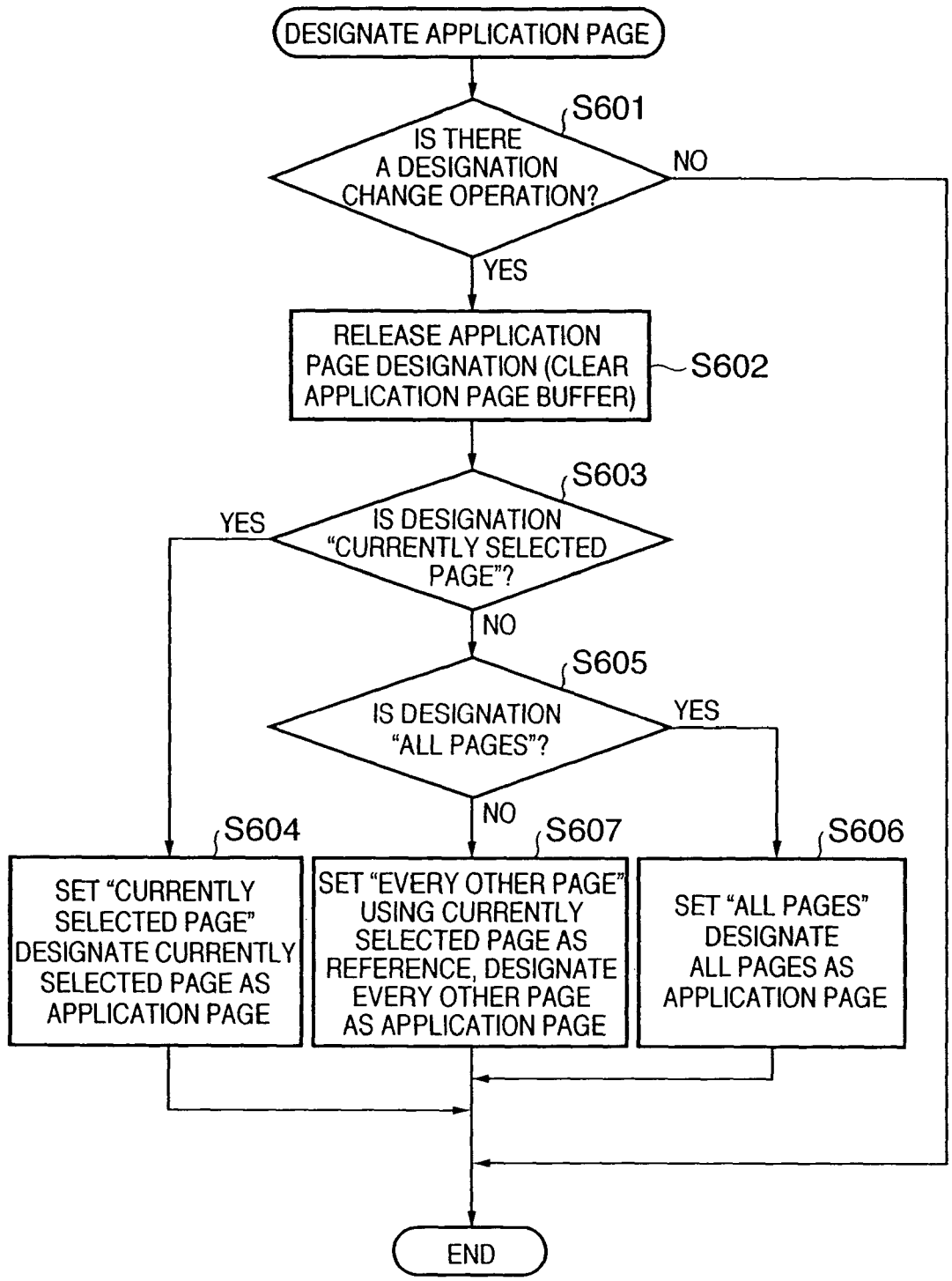
FIG. 6 is a flow chart illustrating details pertaining to a target page designation procedure during editing of a plurality of images.

Next, a detailed description will be given of the individual processes of the multiple image editing process (S306). FIG. 6 is a flow chart illustrating details of the target page designation process (S501) of the multiple image editing process. The image processing application 101 has for the user interface a user interface capable of switching the target page(s) (the target page switch drop-down menu 404 shown in FIG. 4). Through this interface, the user can switch the designation of the target page(s) at any time during the editing of an image by the image processing application 101. The area of possible choices for the target page switch includes the currently selected page (corresponding to the "displayed page" in the target page switch drop-down menu 404 shown in FIG. 4), all pages (corresponding to the "all target pages" in the target page switch drop-down menu 404 shown in FIG. 4), or every other page including the currently selected page (corresponding to the "every other page" in the target page switch drop-down menu 404 shown in FIG. 4).

If the process shown in FIG. 6 has commenced in a case in which the user has changed the target page designation, then step S601 is not always necessary. However, step S601 is necessary where the processes are arranged in series as in FIG. 5.

If the user has changed the target page designation (Yes in S601), then the target page designation is temporarily deleted (S602). In other words, the target page information contained in the target page area 202c is cleared. Then, if the "currently selected page" is designated (S603), the currently selected page is designated the target page. At the same time, information identifying the currently selected page, for example, the file name of the image data file corresponding to the currently selected page, a pointer indicating same, or the like, is recorded in the target page area 202c. In that case, the image processing application 101 user interface enters the state shown in FIG. 4. The currently selected page is displayed in the thumbnail 403 as the target page. The procedure for implementing the selected page and the target page thumbnail display will be described later with reference to FIG. 13.

Figure 8:
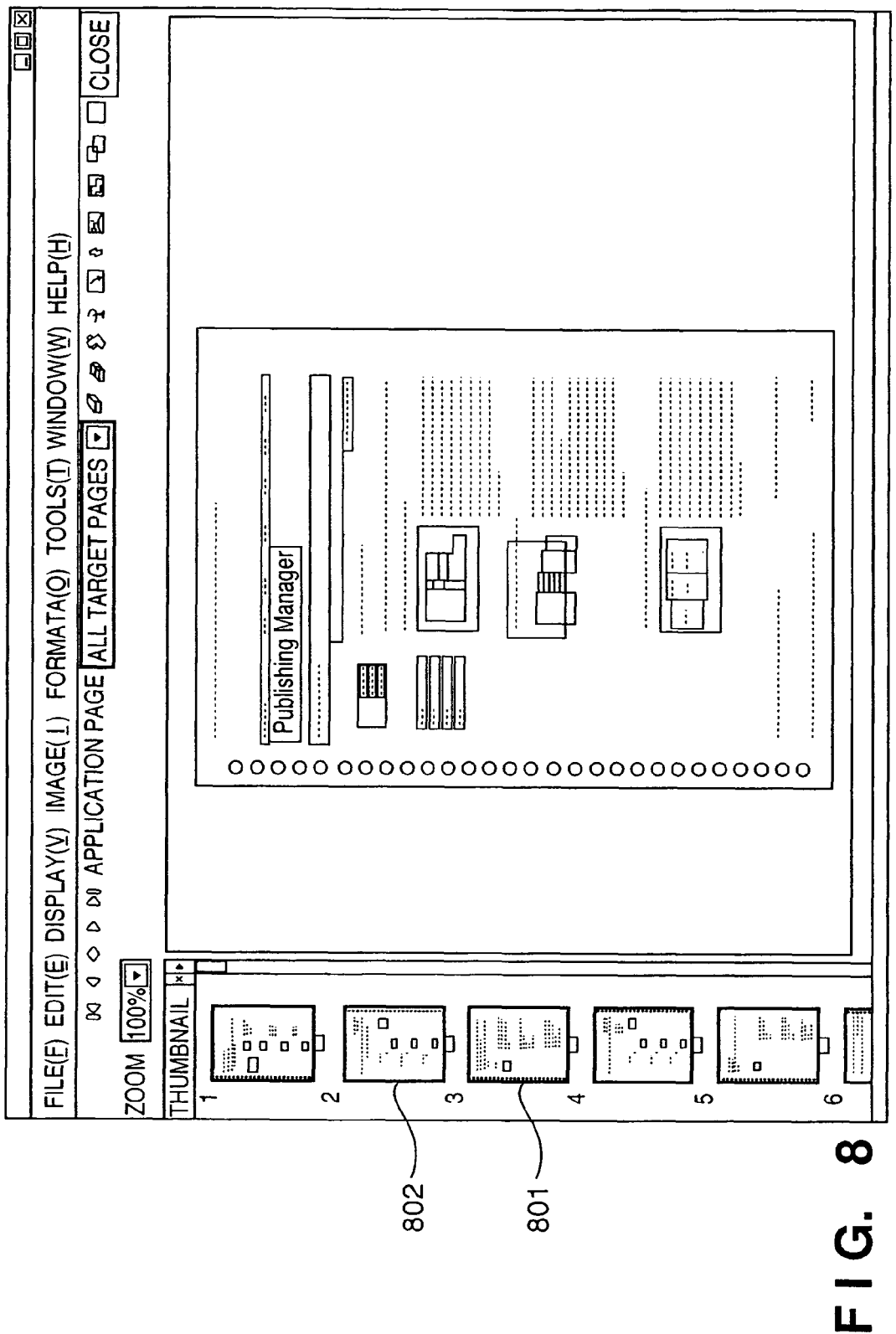
FIG. 8 is a diagram showing one example of a user interface screen of the multiple image processing application.

When "all pages" is designated (S605), all pages are designated as target pages. In other words, identifying information showing "all pages" is recorded in the target page designation area 202a. At the same time, information identifying all pages, for example, the file names of the image data files corresponding to all pages, pointers indicating same, or the like, is recorded in the target page area 202c. However, in the case of all pages, it is not always necessary to specify individual pages. In that case, the image processing application 101 user interface enters the state shown in FIG. 8. All pages are displayed in the thumbnail in a way that makes it possible to identify the target pages (801, 802).

In other cases, that is, when "every other page" is designated (S605), using the currently selected page as a reference, every other page is designated the target page (S607). In other words, identifying information showing "every other page" is recorded in the target page designation area 202a. At the same time, information identifying every other page using the currently selected page as a reference, for example, the file names of the image data files corresponding to every other page, pointers indicating same, or the like, is recorded in the target page area 202c. It should be noted that, in this case, the image processing application 101 user interface enters the state shown in FIG. 7. Using the currently selected page as a reference, every other page is thumbnail-displayed as a target page (701, 702).

(Selected Page Change Process)

Figure 9:
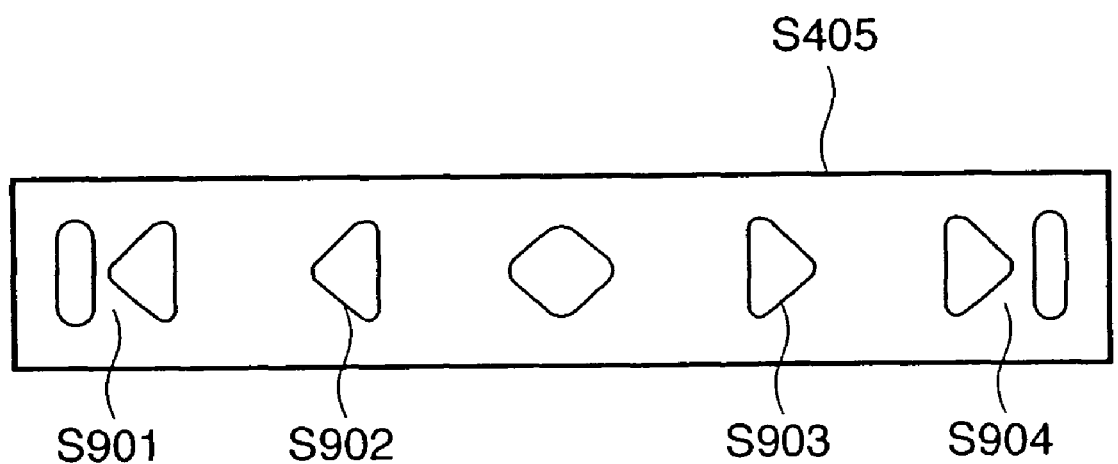
FIG. 9 is a diagram showing one example of a page forward button in a user interface screen of the multiple image processing application.
Figure 10:
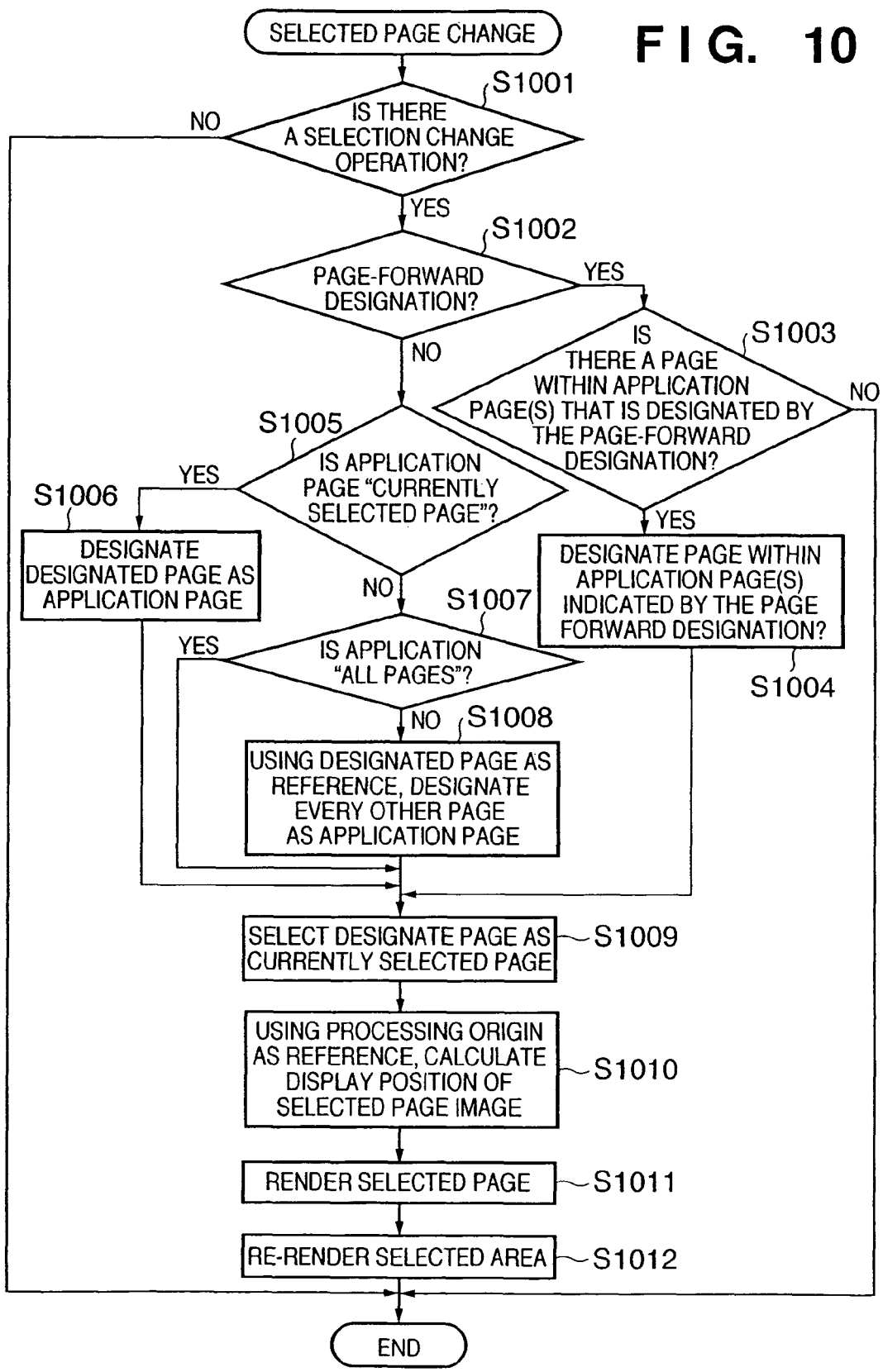
FIG. 10 is a flow chart illustrating details pertaining to a selected page change operation during editing of a plurality of images.

FIG. 10 is a flow chart illustrating details pertaining to a selected page change process (S502) in the multiple image editing process. The user can designate the selected page from the image processing application 101 menu, and by designating a direct thumbnail image from the thumbnail display area 402, the selected page can be designated. In addition, using the page forward button 404 shown in FIG. 9 on the image processing application 101 user interface, the user does not directly designate the page but, using the currently selected page as a reference, can change each of the "first page (901)", "previous page (902)", "next page (903)" and "last page (904)" to the selected page. At this time, the change is of a selected page within the target page area. In addition, a configuration that provides a menu showing the same functions and implements the same functions when the user selects from the menu and presses a button is also possible.

When the selected page is designated using one of the above-described methods and the process shown in FIG. 10 is commenced, step S1001 is not always necessary. However, step S1001 is necessary if the processes are arranged in series as shown in FIG. 5. When the user performs an operation to change the selected page (Yes in S1001), it is determined if that operation is a page-forward designation.

If the operation is a page forward designation, it is determined if a page designatable by the page-forward designation is present in the current target page (S1003). This determination can be implemented, for example, by referring to the target page designation information 202a, the target page information 202c and the currently selected page information 202b. To give an example, if the "currently selected page" is selected for the current target page designation, the target page becomes only the current page. As a result, no matter what the page-forward designation might designate, there is no page within the current target page indicated by the page-forward designation. Where, as just described, there is no page within the current target page that is indicated by the page-forward designation (No in S1003), the process terminates without changing the selected page.

To give another example, where "all pages" is selected for the current target page designation, the target pages becomes all the pages. As a result, provided that the currently selected page is neither the first page nor the last page, then for all page-forward designations a page exists within the currently selected pages that is indicated by the page-forward designation. Where there is a page indicated by the page-forward designation within the current target pages (Yes in S1003), that page is temporarily stored as the user-designated page (S1004) and later processes are carried out. A description will be given later of a later rendering process (S1009 and thereafter).

Figure 17:
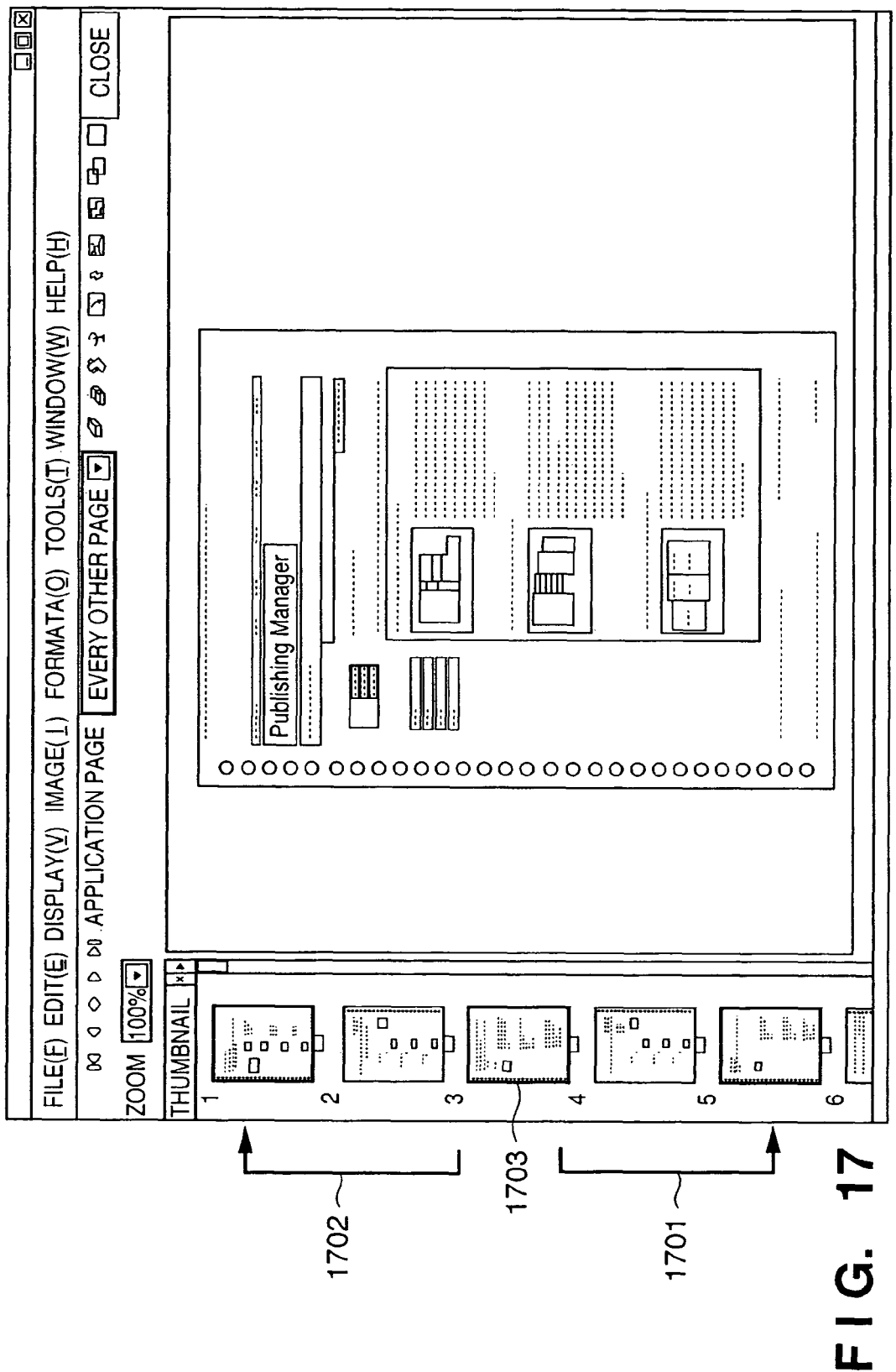
FIG. 17 is a conceptual diagram illustrating a page forward operation of a user interface screen of the image processing application.

To give yet another example, where "every other page" is selected for the current target page, the target pages becomes every other page and the image processing application 101 user interface enters the state shown in FIG. 17. In FIG. 17, a thumbnail 1703 is the currently selected page. If in this state the user designates the "previous page" page-forward button (902) shown in FIG. 9, as shown by arrow 1702, the page before the previous page is temporarily stored as the designated page (S1004). Similarly, if in this state the user designates the "next page" page-forward button (903) shown in FIG. 9, as shown by arrow 1701, the page after the next page is temporarily stored as a designated page (S1004).

If the user selected page change operation is not a page-forward designation (No in S1002), it is determined if the target page designation (S1005) is the "currently selected page". If the page-forward designation is the currently selected page, then the currently selected page is made the target page (S1005). In other words, the target page information 202c is changed to information pertaining to the designated page. Although a description will be given later of the rendering process of S1009 and thereafter, when that process terminates, the multiple image processing application enters the state shown in FIG. 4. The currently selected page as the target page is displayed as a thumbnail (403). The procedure for implementing the thumbnail display of the selected page and the target page will be described later.

If the target page designation is "all pages" (Yes in S1007), the target page does not change even if the selected page changes, and therefore there is no change in the target page information. A description will be given of the rendering process of S1009 and thereafter, but when that process terminates, the multiple image processing application enters the state shown in FIG. 8 (801, 802).

Figure 7:
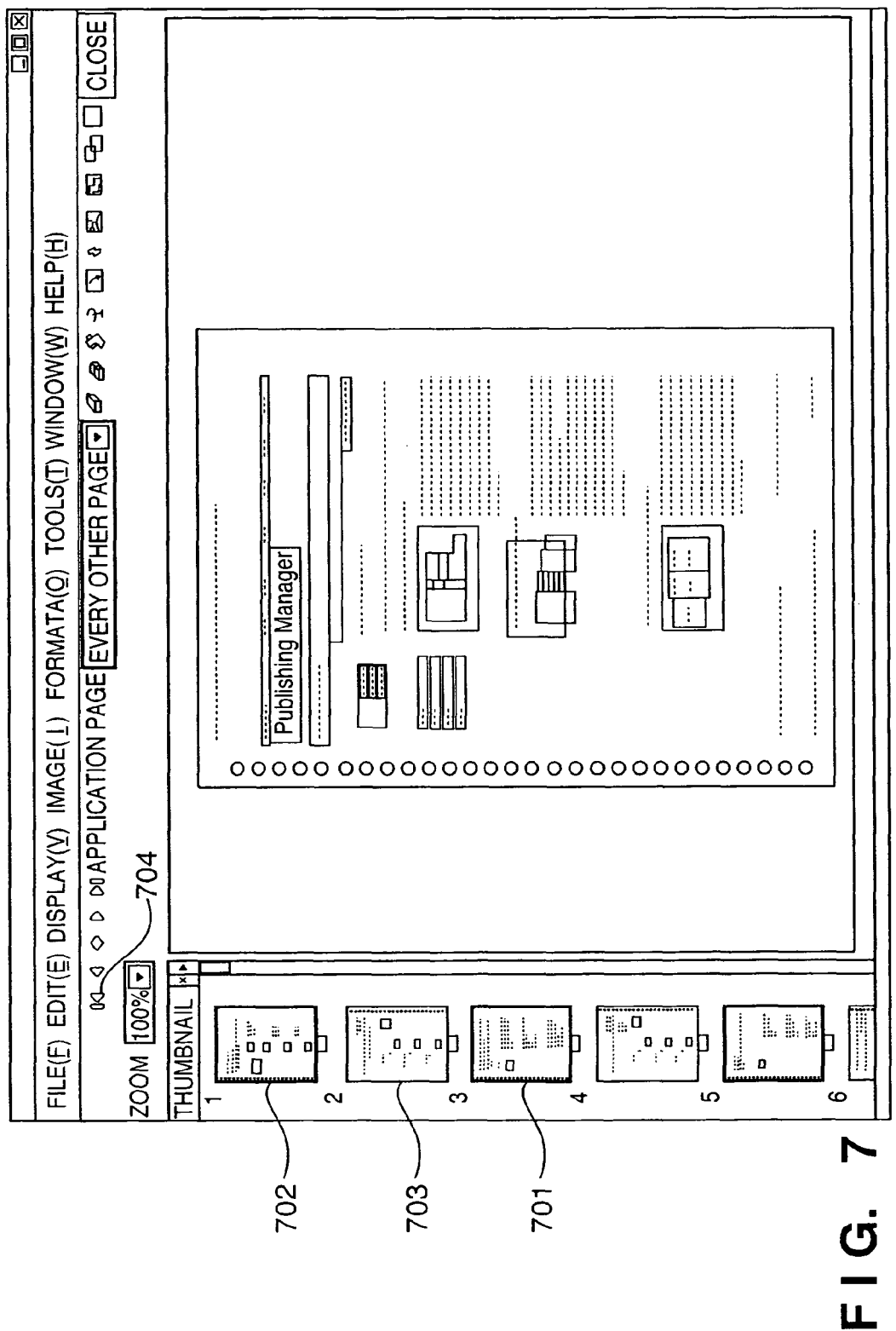
FIG. 7 is a diagram showing one example of a user interface screen of the multiple image processing application.
Figure 11:
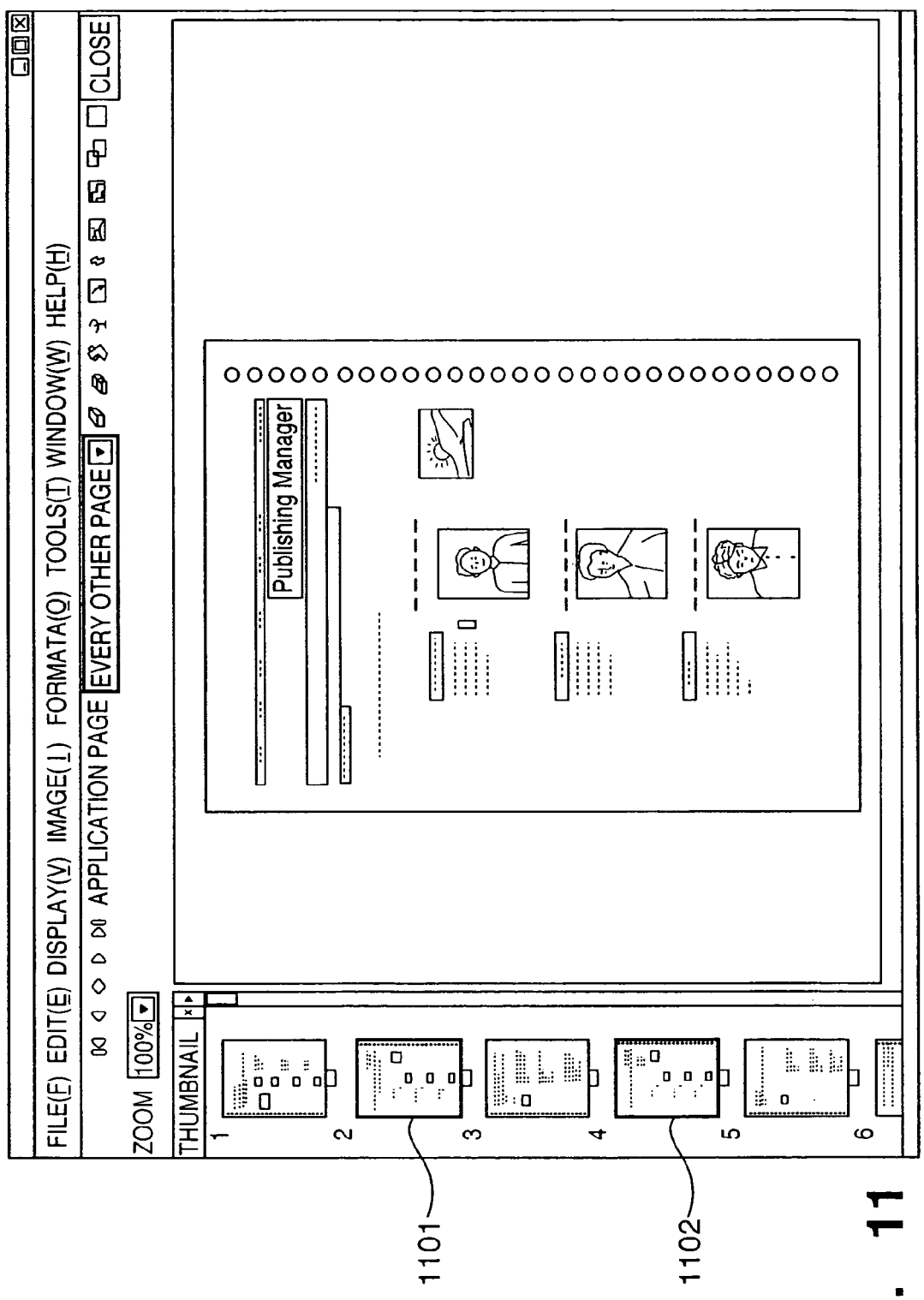
FIG. 11 is a diagram showing one example of a user interface screen of the multiple image processing application.

If instead of either of the foregoing options "every other page" is designated (No in S1005), using the designated page as a reference, every other page including the designated page is made the target pages (S1008). In other words, the target page information 202c is updated with information pertaining to every other page including the designated page as a reference. A description will be given of the rendering process of S1009 and thereafter, but when that process terminates, the multiple image processing application user interface enters the state shown in FIG. 7 or FIG. 11. For example, if the page 701 shown in FIG. 7 is selected, the image processing application enters the state shown in FIG. 7. Using the currently selected page as a reference, every other page is thumbnail-displayed as a target page (701, 702). In addition, if, for example, a page 1101 shown in FIG. 11 is selected, then the image processing application 101 enters the state shown in FIG. 11. Using the currently selected page 1101 as a reference, every other page is thumbnail-displayed as a target page (1101, 1102).

In all the foregoing cases, the page that the user designates (or the page deemed to be designated) is selected as the currently selected page (S1009). In other words, information for identifying the designated page is recorded as the selected page information 202b. Next, the currently selected page is calculated (S1010). In other words, the origin of the current retouch position on the user interface screen is calculated (called the processing origin in FIG. 10), and the position of the currently selected page is calculated so that the alignment position of the currently selected page and the processing origin coincide. These calculations are done because the position of the page is determined in advance, for example, the upper left corner. As a result, it is necessary to obtain the coordinates of a page reference position (for example, the upper left corner point) in a coordinate system that uses the processing origin as a reference.

Specifically, for example, the following process can be carried out. First, assume a coordinate system (called a retouch coordinate system) for the purpose of setting a retouch position and area. The origin of this coordinate system is the processing origin described above. The retouch position information 202e is shown as a coordinate in this retouch coordinate system. Then, if the selected page image size is x×y pixels and the page reference point is the upper left, then the position of that reference point in the retouch coordinate system is calculated. If the alignment position designation is "upper left", then, since the page reference point and the processing origin coincide, the coordinates of the page reference point in the retouch coordinate system are (0,0). If "right" is included in the alignment position designation, a value that represents the inverse of the encoding of the horizontal size of the image becomes the X coordinate, and if "lower" is included in the alignment position designation, a value that represents the inverse of the encoding of the vertical size of the image becomes the Y coordinate. For example, if the alignment position is "lower right", then, since this designation contains the terms "lower" and "right", the page reference position coordinates are (−x,−y). Of course, the inclusion of the terms "lower" and "right" does not have a limited meaning like that of setting the alignment position designation information 202d in letters and scanning it, and means no more than that it is possible to calculate the X and Y coordinates independently. In addition, if the method of designating vertical and horizontal includes the term "central", then the respective X and Y components become −x/2, −y/2 depending on whether the designation is in the vertical direction or the horizontal direction. The foregoing is of course nor more than illustrative. In short, the page reference position is converted into a coordinate system that has as its origin a position designated as an alignment position. Thus can the position of the currently selected page in the retouch coordinate system be calculated.

Next, the currently selected page is arranged and displayed on the user interface (in particular the area for displaying an image of the selected page), using as a reference the page reference position in the retouch coordinate system. The display necessitates converting the retouch coordinate system into a coordinate system on the user interface screen. This conversion may accompany sizing if the image display has been sized, or it may accompany translation to a display coordinate system. In addition, in order to continuously display the selected page and the retouch value and area, the following can be carried out. That is, for example, the size of the user interface screen may be determined by finding in advance the largest-sized page in the vertical and horizontal directions for all the pages to be processed and settling on the screen size that is displayable in both directions. The selected page may be reduction-displayed on the user interface provided that the reduced image is displayable.

If the rate of reduction of the image size is determined as described above, then preferably the processing origin on the user interface screen is switched so that the retouch position (so long as the retouch position designation is not changed) does not change on the user interface screen. For example, the alignment position designation may be applied to the user interface screen, and if "upper left" is designated, moves the position of the processing origin toward the upper left of the user interface (in particular the area that displays an image of the selected page). If "lower right" is designated, then the processing origin is moved toward the lower right of the user interface (in particular the area that displays an image of the selected page). It is not necessary that the processing origin be placed precisely at the corner, and it is preferable that the processing origin be positioned slightly inside the corner in order to secure a margin.

More preferably still, the display is such that the initially designated alignment position (that is, the original processing origin) is not moved in the coordinate system on the user interface. By thus setting the relative positions of the user interface screen and the original processing origin, even if the selected page or the alignment position designation is switched, the retouch position, so long as it is not changed, continues to be displayed at a fixed position on the user interface.

From atop the above-described display of the currently selected page, an object of a frame or the like showing the current retouch position and area is drawn having as its origin a position designated as the alignment position (S1012) and the selected page change process terminates. The position of the object of a frame or the like showing the current retouch position and area is determined based on the retouch position information 202e. The retouch position information 202e is given by the coordinates of the retouch coordinate system having the processing origin as its origin, and therefore there is no need for coordinate conversion other than that for display of the user interface. The position at which the current selected area is drawn before and after the selected page is changed does not move on the user interface but is drawn at the same position.

Figure 18:
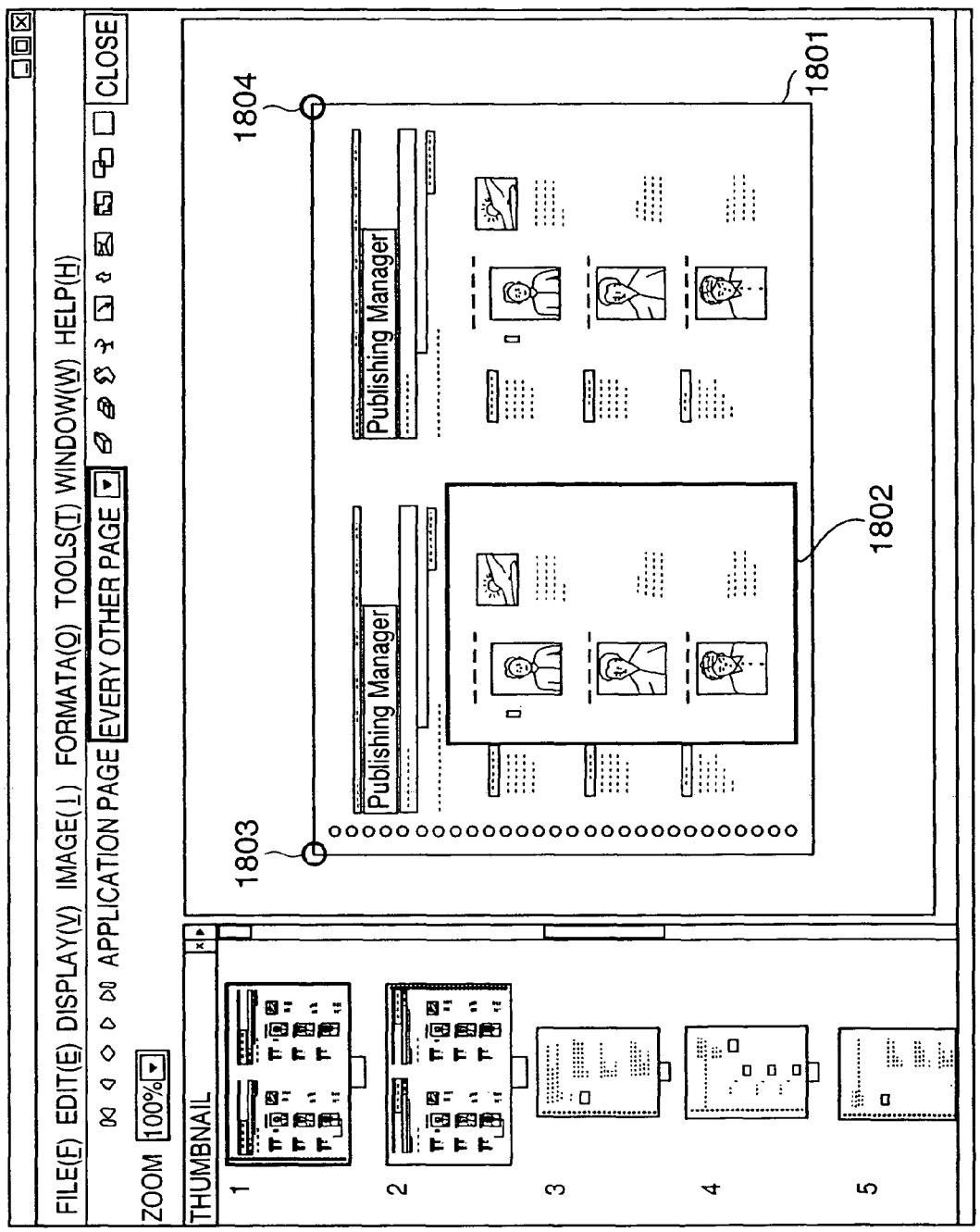
FIG. 18 is a diagram showing one example of a user interface screen of the multiple image processing application.
Figure 19:
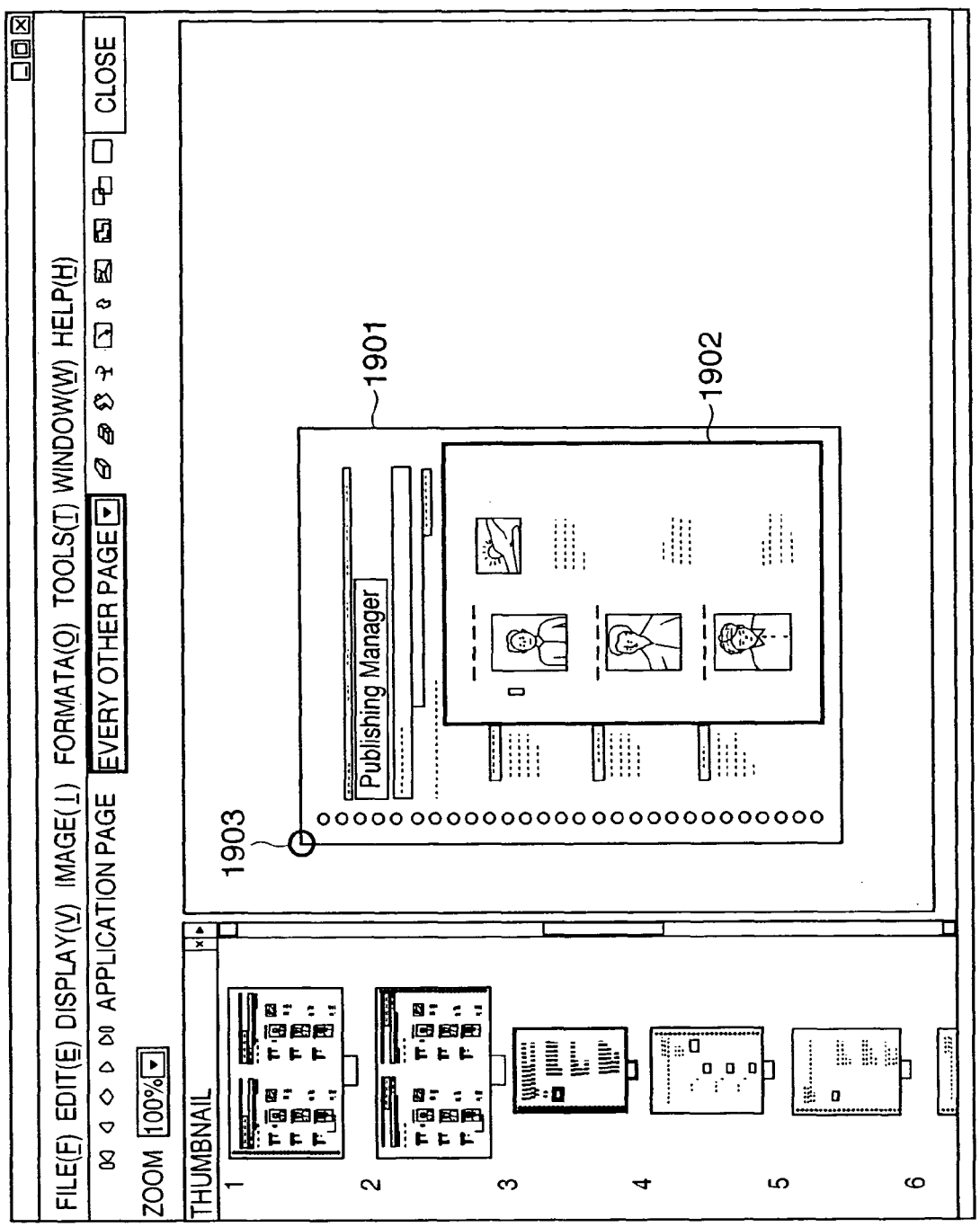
FIG. 19 is a diagram showing one example of a user interface screen of the multiple image processing application.
Figure 20:
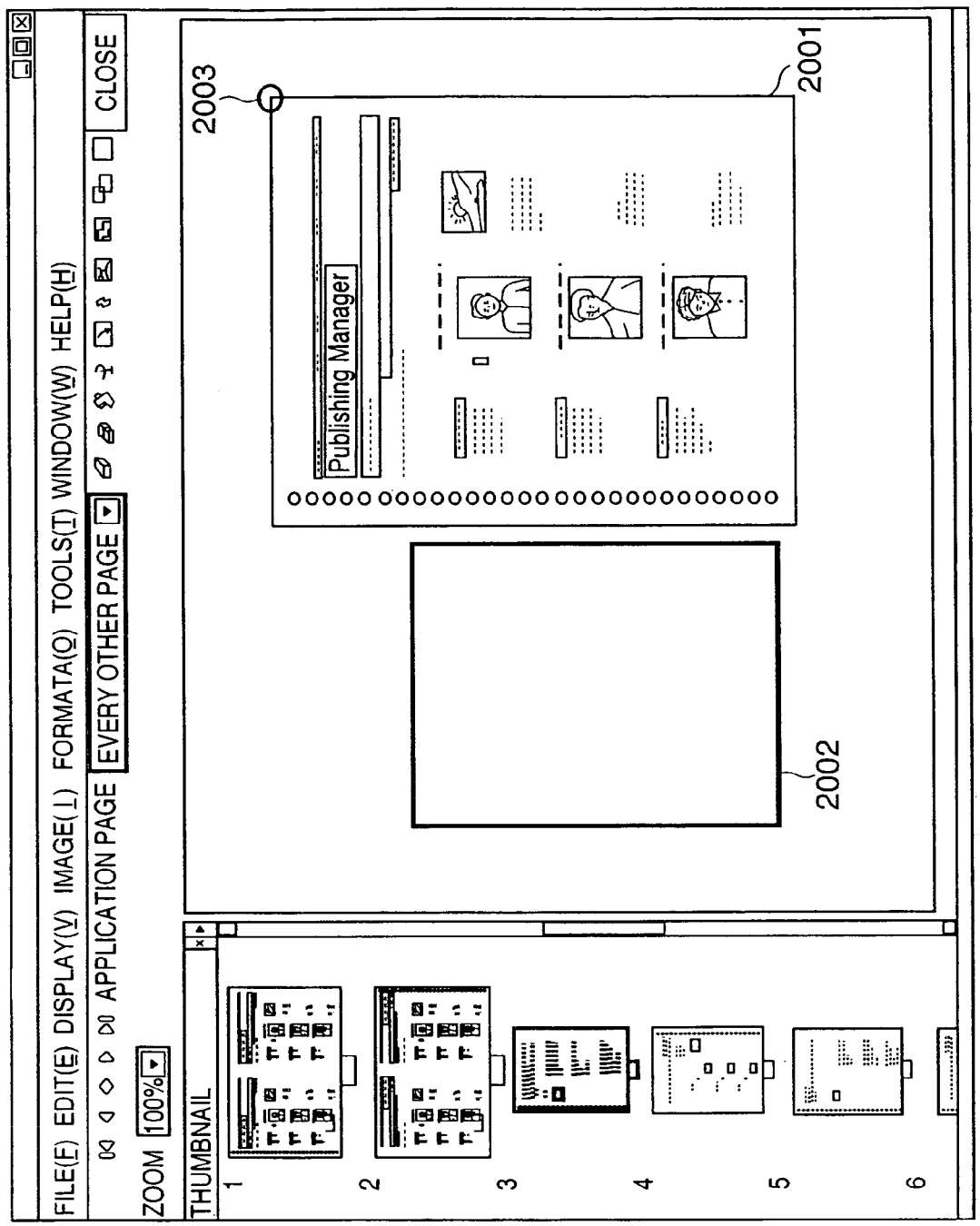
FIG. 20 is a diagram showing one example of a user interface screen of the multiple image processing application.

FIGS. 18, 19 and 20 show examples of renderings of a current selected area from a display of a currently selected page in a multiple image processing application. In FIG. 18, if the size of the currently selected page (1801) is A3, a selected area designated as the retouch position (1802) is displayed. If, in this state, the user selects the page-forward button "next page" (903) shown in FIG. 9 and the size of the selected page is A4, and moreover if the alignment position designation is "upper left", then the selected page (1901) is displayed at the position shown in FIG. 19. A selected area designated as the retouch position (1902) is displayed at the same position on the user interface of the multiple image processing application. If the user selects the page-forward button "next page" (903) shown in FIG. 9 and the size of the selected page is A4, and moreover if the alignment position designation is "upper right", then the selected page (2001) is displayed at the position shown in FIG. 20, and the selected area designated as the retouch position (2002) is displayed at the same position on the user interface of the multiple image processing application.

Figure 14:
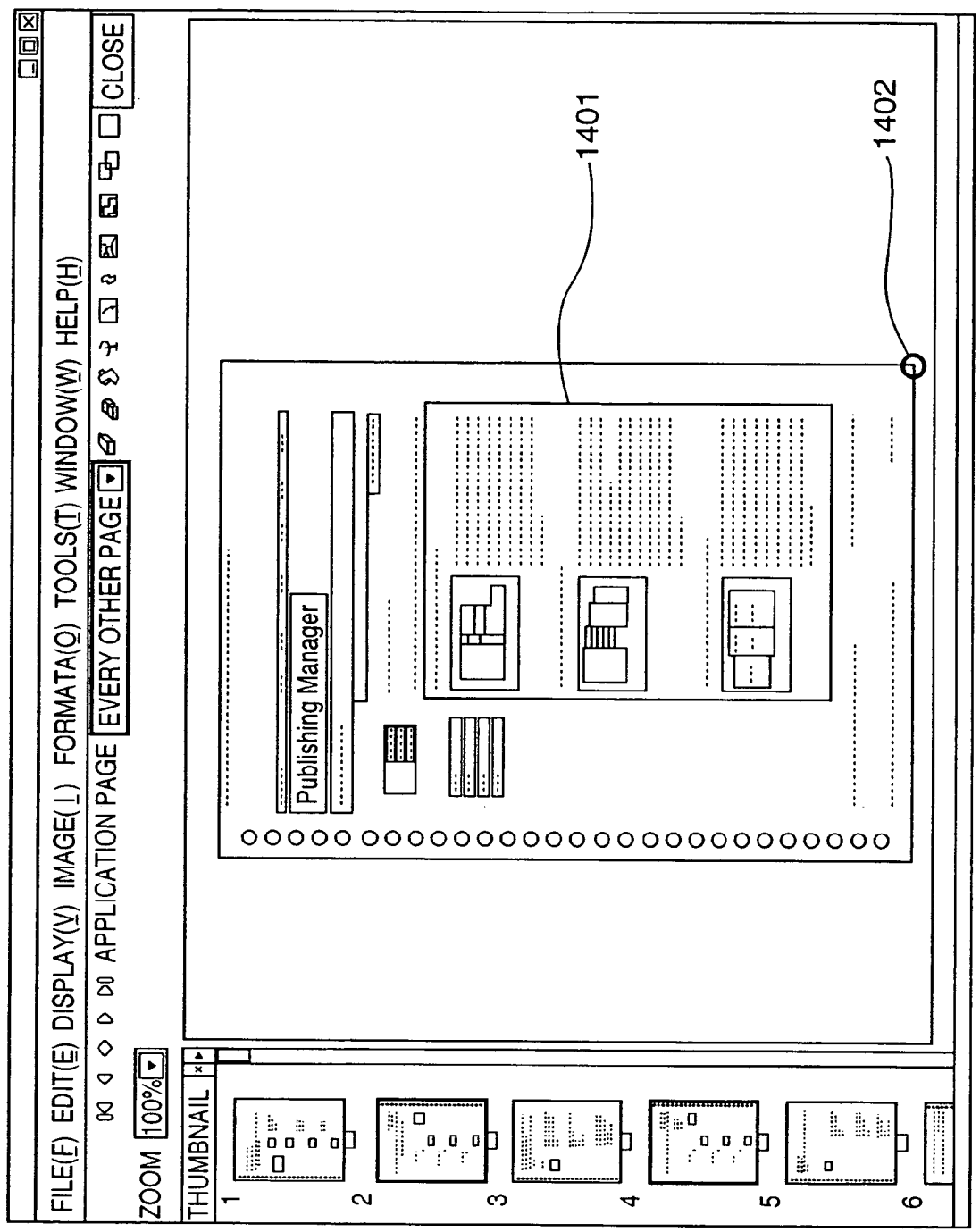
FIG. 14 is a diagram showing one example of a user interface screen of the image processing application showing an image retouch position.

Next, a description will be given of the procedure for designating the retouch position (S503) during editing of a plurality of images (S306). The user designates the position at which retouching is to be applied by a drag-and-drop operation on the image of the currently selected page displayed on the image processing application 101 user interface 401. FIG. 14 is a diagram showing one example of an image processing application 101 user interface display showing a retouch position created in the foregoing manner. The retouch position is displayed in a red frame (frame 1401 in the diagram), to distinguish it from the remaining areas.

The retouch position and area is calculated and maintained using as a reference a position on the selected page image that is indicated by a designation value designated by a alignment position designation to be described later. As one example, in a case in which the retouch position shown in FIG. 14 is designated, if the alignment position designation includes the designation "lower right", the retouch position is calculated based on the lower right corner 1402 of the selected page image, and in the case of 1401 the retouch is positioned in the negative direction along both the vertical and horizontal axes compared to the reference point 1402.

In addition, by using a configuration that has a plurality of areas holding retouch positions it is possible to designate multiple retouch positions with ease.

(Alignment Position Designation Process)

Figure 12:
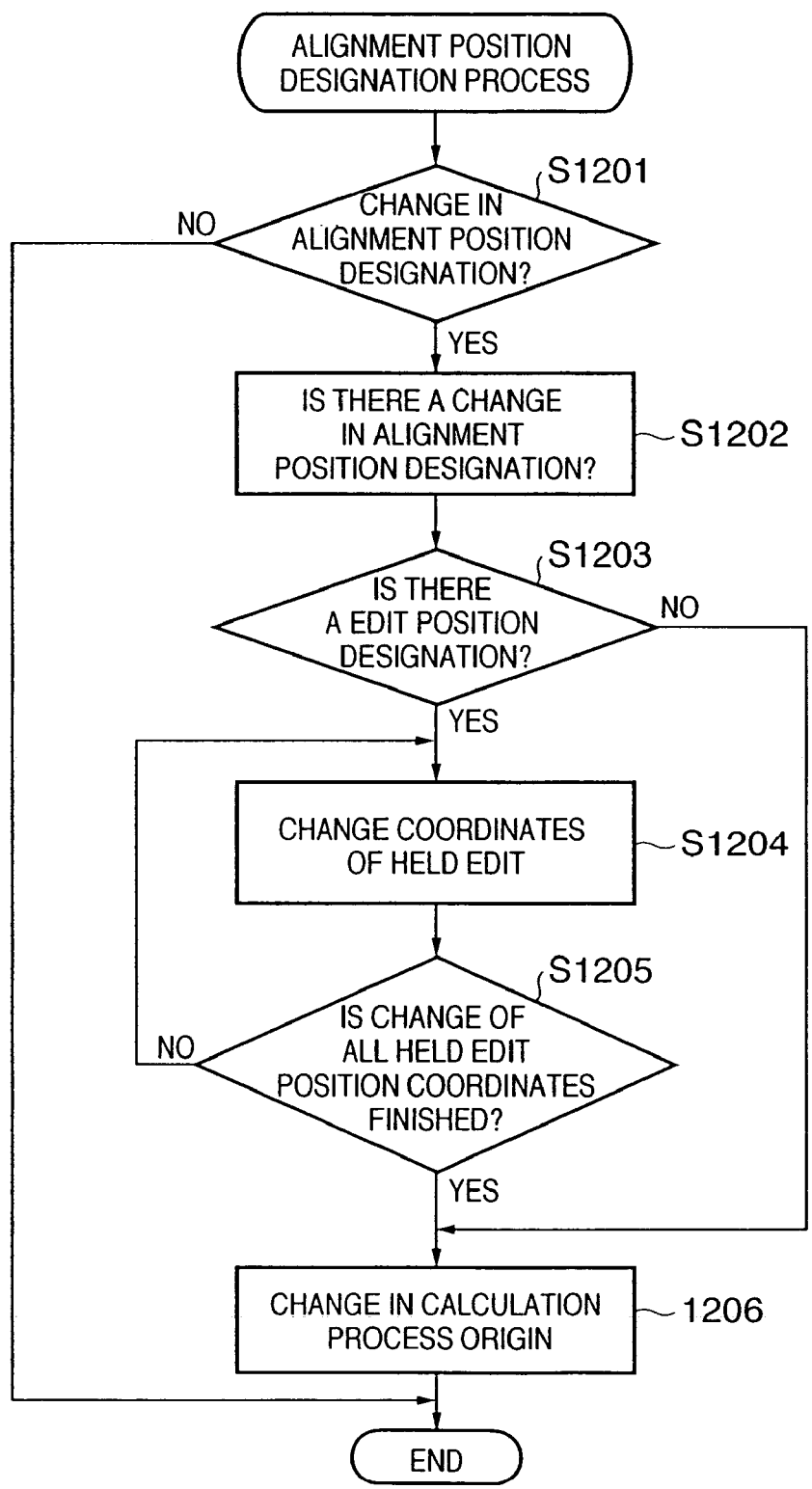
FIG. 12 is a flow chart illustrating details of an alignment position designation process during editing of a plurality of images.
Figure 15:
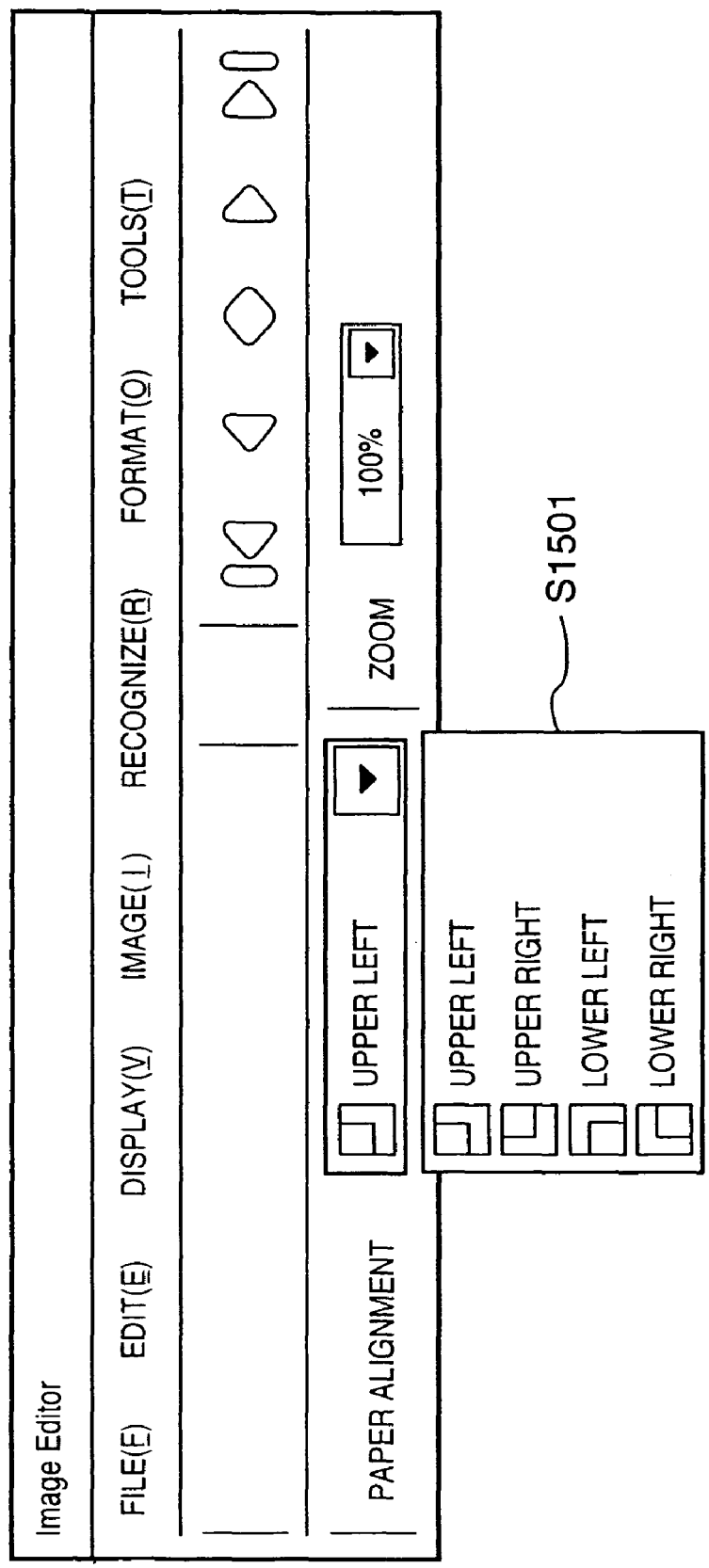
FIG. 15 is a diagram showing one example of a list of possible alignment designations in a user interface screen of the image processing application.
Figure 16B:
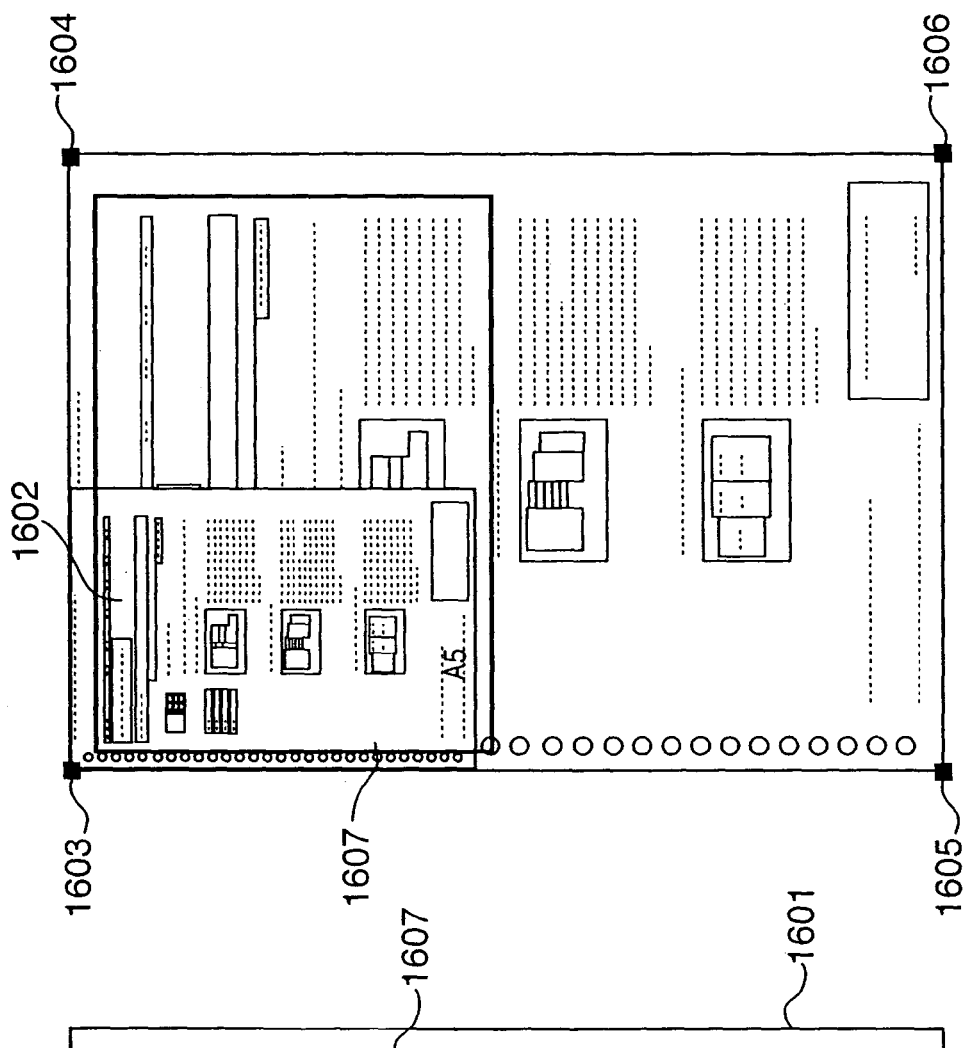
FIGS. 16A and 16B are schematic diagrams showing the concept of an alignment position designation of the image processing application.
Figure 16A:
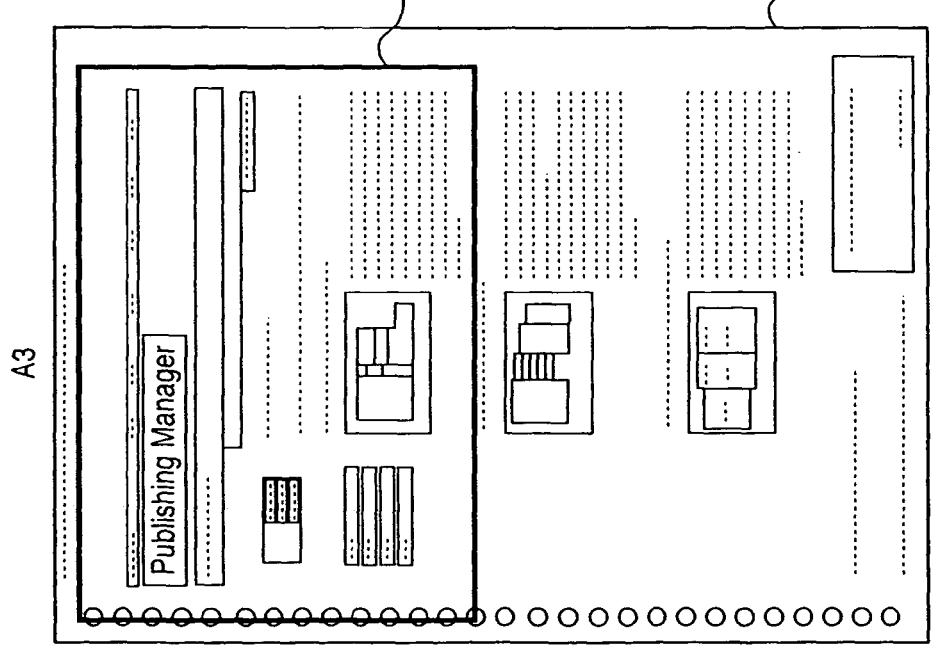

FIG. 12 is a flow chart illustrating details of an alignment position (same as image alignment position) designation process (S504) during editing of a plurality of images (S306). A list 1501 of possible alignment position designations like that shown in FIG. 15 is displayed on the image processing application 101 user interface 401, and the user can change designations at any time. The alignment position designation, where retouching a plurality of images at once, involves which coordinates of the image pages to apply the above-described retouch position, and is information that designates image page alignment positions. The retouch position on the selected page image is calculated using as a reference a position indicated by a designation value that designates an alignment position. As an example, a description will be given of retouching an A3-size image and an A5-size image in one operation, using the schematic diagrams of FIGS. 16A, 16B. In an A3-size image 1601 shown in FIG. 16A, area 1607 is designated as the retouch position. If "upper left" is designated by the alignment position designation and an image erase editing operation has been carried out, area 1607, which is the upper half of the A3 image 1601, becomes blank. Additionally, in an A5-size image 1602 shown in FIG. 16B, the upper left 1603 corner of an A5 image 1602 is deemed disposed so as to overlap the upper left corner 1603 of the A3 image 1601 and an image erase editing operation is carried out at the position of the retouch position 1607. As a result, most of the page of the A5 image 1602 becomes blank.

By contrast, if "lower right" is designated by the alignment position designation and an image erase editing operation is carried out, the area 1607, which is the upper half of the A3 image 1601 shown in FIG. 16A, becomes blank. Then, the lower right 1606 of the A3 image 1601 and the lower right of the A5 image 1602 are deemed disposed so as to overlap, and an image erase editing operation is carried out at the position of the retouch position 1607 (see FIG. 16B). As a result, retouching is not applied to most of the page of the A5 image 1602 and the A4 image 1602 remains as is.

The remaining alignment position designations "upper right" and "lower left" are the same. In addition, although in the present embodiment "upper right", "upper left", "lower right" and "lower left" are given as the area of choices for the alignment position designation, configurations that include points other than these in the area of options are also similarly possible. As an example, it is possible to add "top center", "bottom center", "right center", "left center" and "center" to the area of choices.

In FIG. 12, if the alignment position designation is designated by the user and represents a change from the current alignment position designation (Yes in S1201), then for the currently selected page the difference between the new alignment position coordinates using the current alignment position as the origin (that is, the new alignment position coordinates having the current alignment position coordinates as its origin) is calculated (S1202). It should be noted that the coordinates of the process shown in FIG. 12 are coordinates in a case in which the image data targeted for processing is rendered as two-dimensional data, for example, values shown in pixel units. In addition, the right side and the bottom are assumed to be in the positive direction from the origin along their respective axes. The current alignment position is saved in the alignment position designation information 202d.

As one example, assume that, for example, the size of the currently selected page is 100 pixels horizontally and 200 pixels vertically. If "lower right" is selected as the alignment position designation and the user changes the alignment position designation to "upper left", the new alignment position coordinates are (−100, −200), which is a subtraction of (100, 200) in each coordinate component from the coordinate origin (0,0).

Next, if there is one or more retouch position designations (Yes in S1203), then the new alignment position coordinates calculated in step S1202 are subtracted from the retained retouch position coordinates (retouch position information 202e). According to the same example as in step S1202, if the retouch position coordinates are (0,0), then the (100,200) obtained by subtracting (−100,−200) from the (0,0) in each coordinate component becomes the new retouch position information. This value is saved as the retouch position information 202e.

The value to be subtracted depends on the alignment position, and varies depending on the size of the selected image. Therefore, in the above-described example, the value (100, 200) can be generalized, as, for example (x,y).

The foregoing is repeated as many times as there are retouch positions (S1205). After all the retouch positions have been updated, or, alternatively, if there was no retouch position designation, then the origin of the display position calculation process of the retouch position designation and the selected page image (that is, the processing origin) is moved to a point designated by the alignment position designation on the currently selected page image (S1206). In the same example as that of S1202, the alignment position designation is changed from "lower right" to "upper left", and the calculation processing origin is also changed from "lower right" to "upper left", with the amount of the change being (−100,−200). When the change of processing origin is finished, the alignment position designation process is terminated. It should be noted that the change of coordinate origin is none other than a translation of coordinates, and for the retouch position that conversion is completed by the above-described procedure. Therefore, provided there is no need for coordinate conversion besides that for the retouch position, nothing in particular is performed in step S1206. If there is such a necessity, then conversions for those coordinates are carried out in the same manner as step S1204.

(Thumbnail Update Process)

Figure 13:
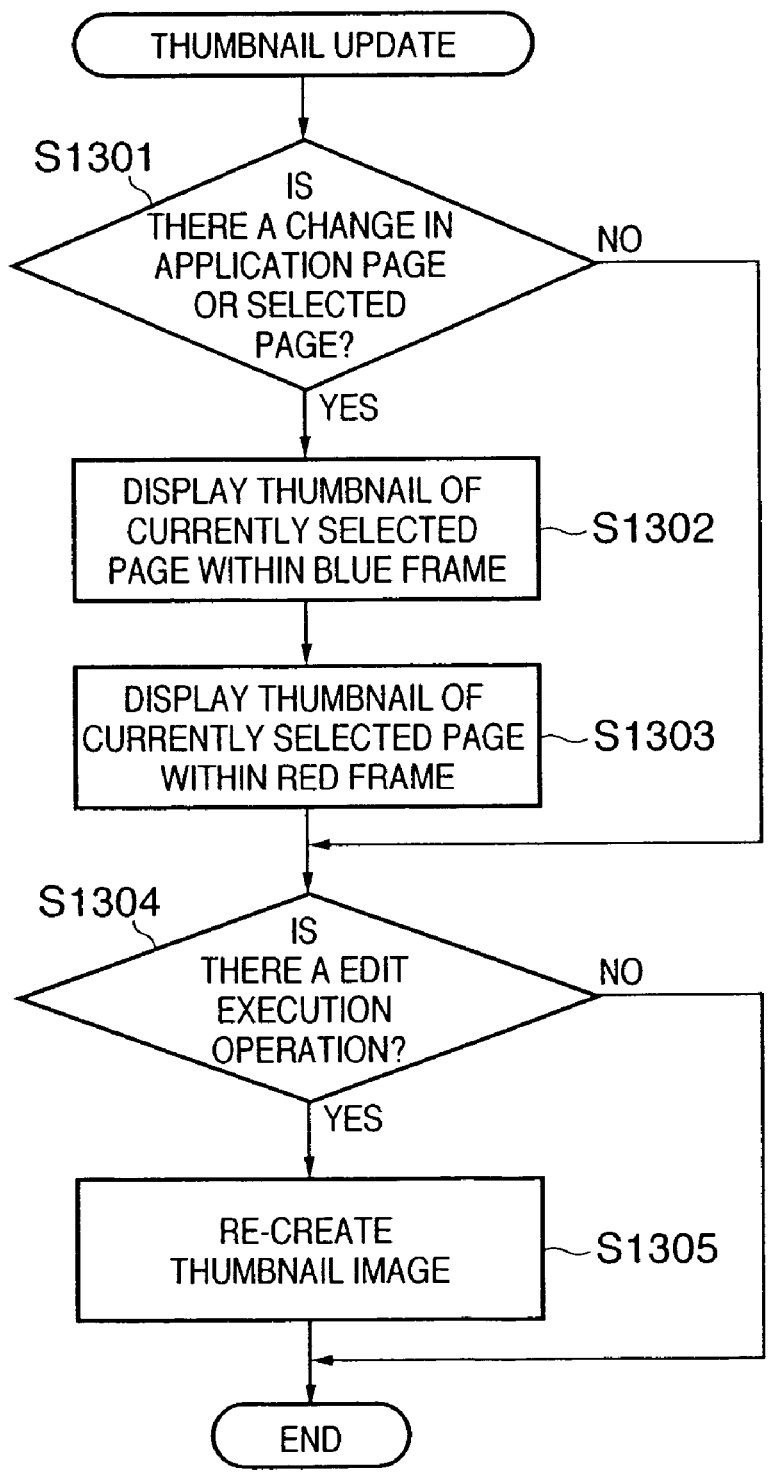
FIG. 13 is a flow chart illustrating details pertaining to a thumbnail update operation during editing of a plurality of images.

Next, a description will be given of the procedure for implementing the thumbnail display of the selected page and the target page, using FIG. 13. FIG. 13 is a flow chart illustrating details pertaining to a thumbnail update operation (S506) during editing of a plurality of images. If there is a change in the target page or the selected page due to user designation (S1301), then thumbnails of all the current target pages are outlined in blue and displayed (S1302) and the thumbnail of the currently selected page is outlined in red and displayed (S1303). The current target page can be identified from the current target page information 202c. The currently selected page can be identified from the selected page information 202b. By this process, the currently selected page is always one of the target pages and is framed in red. In addition, the currently selected page is kept a single page. Multiple pages are never framed in red.

Thereafter, it is determined whether or not a multiple image editing process retouch contents designation or retouch execution have been carried out (S1304), and if so, a thumbnail image is re-created for the target page(s) that have been retouched (S1305) and the thumbnail update operation is terminated.

(Retouch Position Designation Process)

Figure 22:
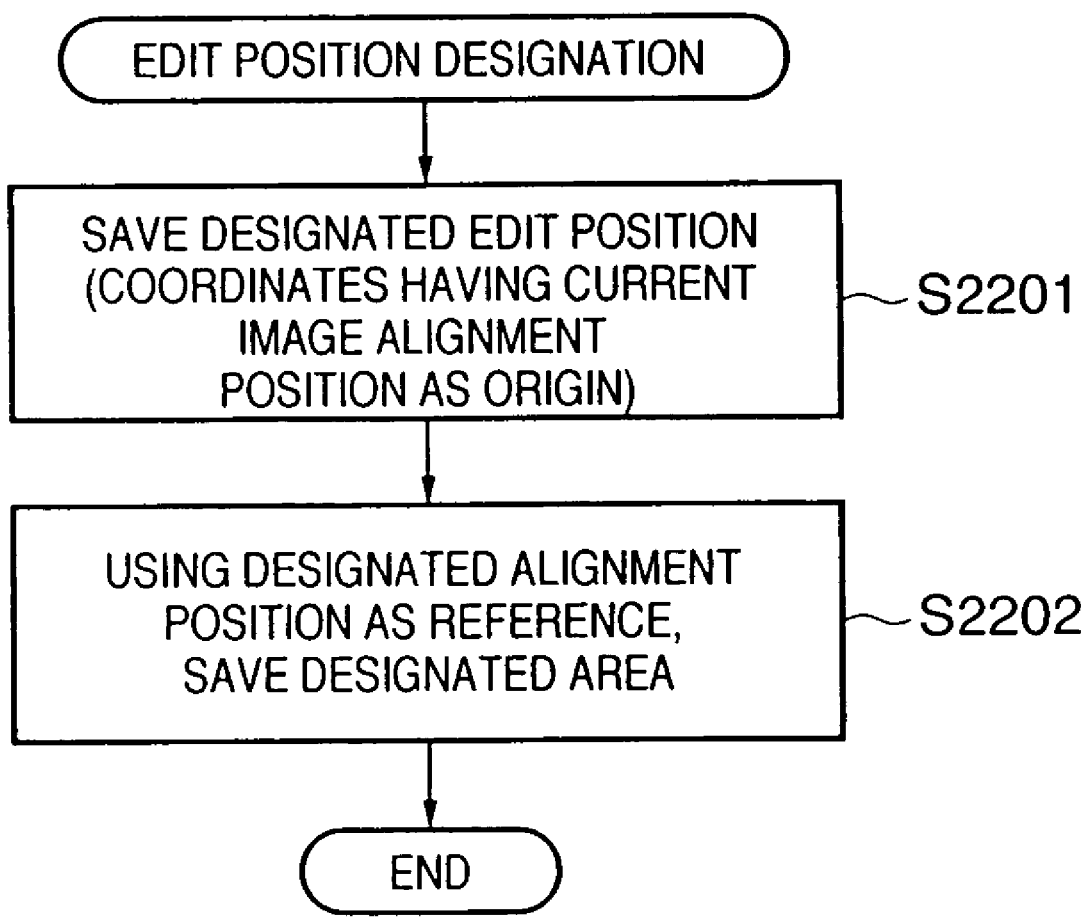
FIG. 22 is a flow chart illustrating details of a retouch position designation operation during editing of a plurality of images.

A description will now be given of a retouch position designation process in step S503 shown in FIG. 5, with reference to FIG. 22. This process is a step of simply inputting the retouch position information 202e. For example, the retouch position and a retouch range of the area to be retouched are input by the user designating a desired area on a reduced image of the currently selected page displayed on a user interface screen like that shown in FIG. 4 using a pointing device or the like. The retouch position is expressed as coordinates having as their origin a position designated as the alignment position in the currently selected image. For example, if the alignment position designation is "lower right", then the retouch position is expressed as coordinates that take as their origin (the processing origin described above) the lower right corner of the selected image. That which is designated is on the user interface screen, and therefore the acquired retouch position is coordinates on the user interface, but the retouch position information 202e of a retouch coordinate system can be obtained by turning the inverse transformation obtained when reduction-displaying the selected page on the user interface screen into coordinates on the user interface. In step S2201 this value is saved. The retouch area may be expressed by the lengths in the X and Y directions using the retouch position as a reference, and these, too, are saved as retouch position information 202e (step S2202).

Of course, other methods of designation besides these can be used. For example, the retouch position can be designating by designating an area formed by the right, left, top and bottom sides of an image and a distance from the reference sides. In this case, in order to identify a position on a plane, it is necessary to choose two sides that are not parallel to each other as the reference sides. In addition, the corners of a rectangle disposed opposite reference points and defined by distance and direction from the reference points can be designated and that rectangle designated as the retouch area. A menu or the like that displays input columns for input, for example, may be provided for the user interface for this purpose.

Moreover, in addition, a method such as that of scanning a document on which the retouch area is written in as frame lines and scanned from an image scanner or the like is conceivable in this case, the frame lines showing the retouch area are translated so that the position on the scanned document image designated the alignment position becomes the processing origin in the retouch coordinate system, and appropriate positions of the translated frame lines are saved as retouch position information 202e. In addition, information for identifying the frame lines using the retouch position as a reference is made the retouch area and saved in the retouch position information 202e. Thus, as described above, there are a variety of input methods.

(Retouch Process)

Figure 21:
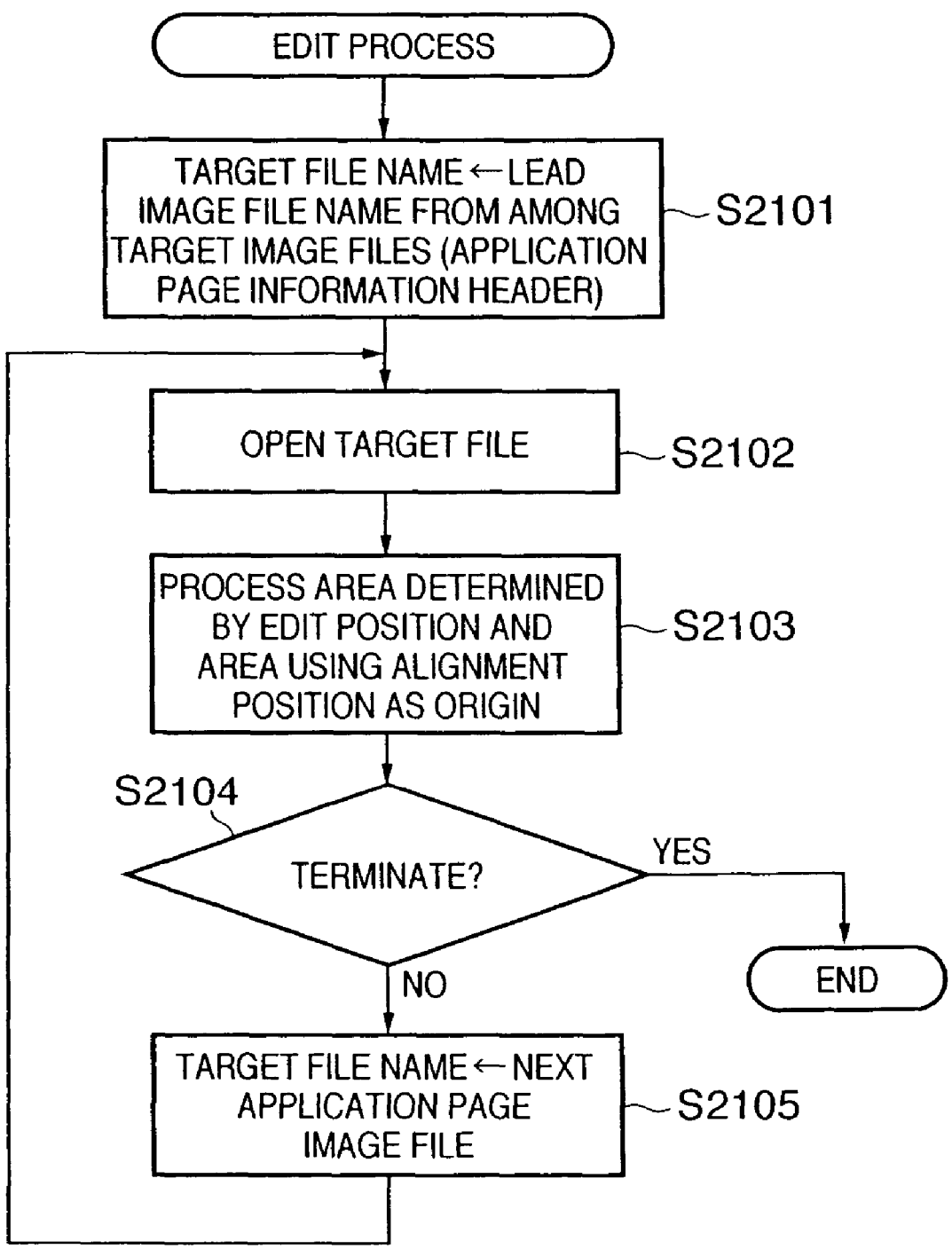
FIG. 21 is a flow chart illustrating details of an image processing operation during editing of a plurality of images.

Next, a description will be given of the retouch process in step S505 shown in FIG. 5, with reference to FIG. 21. The processes shown in FIG. 21 are executed by designating from the user interface such items as, for example "execute image processing".

First, as the target file name, the lead image data file in a file to be processed, that is, information identifying the lead image data file in the target page information 202c, for example a file name, is saved in a target file name area provided in the memory (S1201). Next, the image data file of the file name saved in the target file name area is opened and rendered in the memory as image data (S1202). This image data is called target image data. Then, separately designated image processing is carried out on an area identified by the position and area designated by the retouch position information 202e (called the retouch area), using as its origin a position designated the alignment position saved in the alignment position designation information 202d. In this instance, it is not always the case that the entire retouch area is in the target image data. Accordingly, during image processing, an area in which the editing area and the target image overlap is sought first, and it is also possible to arrange matters so that absolutely no image processing is performed if there is no overlap area. In this case, it is also possible to perform image processing solely on the overlap area. An overlap area may be defined, for example, as an area of overlap in which an area of a retouch target exists within the respective X and Y dimensions of an area of target image data. By limiting the image processing area to within the target image data in the foregoing manner, the memory capacity required for image processing can be reduced.

Specifically, the retouch area can be identified as follows. That is, assume that each piece of image data is defined by a coordinate system that takes as its origin the reference point therefor. Then, the retouch position in the retouch coordinate system is converted into a target image data coordinate system, and the retouch position thus obtained is retouched. In order to do so, the image data position (for example, the coordinates of the lower right corner of the image) corresponding to the alignment position designation (for example, "lower right") is expressed as coordinates (which is clear from the size of the image data) having as their origin the reference position of the target image (for example, the upper left corner), and the encoding of the values of the coordinate components of these coordinates is inverted. The coordinates thus obtained are the coordinates of the reference position where the position on the target image corresponding to the alignment position designation is taken as the origin. The retouch position coordinates saved in the retouch position information 202e are given by the sum of the coordinates of the retouch position of the target image where the position on the target image corresponding to the alignment position designation is taken as the origin plus the coordinates of the retouch position having as its origin the reference position of the target image. Therefore, the coordinates of the retouch position having the position on the target image corresponding to the alignment position designation as the origin can be obtained by subtracting the coordinates of the reference position of the target image taking as its origin the position on the target image corresponding to the alignment position designation from the coordinates of the retouch position taking as its origin the reference position of the target image. The area of the target image corresponding to this position is the target of the designated process, which is clear from vector addition and subtraction.

Furthermore, image processing can be designated separately for each retouch position. Accordingly, where a plurality of retouch positions are designated, different types of image processing can be performed on the respective retouch positions. For example, a given area identified by a given retouch position and area can be whited out and noise reduction can be designated for a separate area. Next, it is determined whether or not processing of the target page is finished (S2104), and if so, the process terminates. If it is determined that processing of the target page is not finished, then information for identifying the next image data file from the target page information 202c is stored in the target file name area (S1205) and the process repeats from step S2102. The image-processed image data files are saved with the same name.

Thus, as described above, for a plurality of pages (image data) targeted for processing, for an area defined as a retouch position given using the alignment position as the origin, a fixed image process designated for that area can be implemented.

The image processing system operates according to the procedure described above when the application 101 is run for multiple images.

The retouched image data can then be printed using the printer 107 or the like shown in FIG. 2. In addition, the retouched image data can be supplied to the document processing system 104 shown in FIG. 1 as input data to the document processing system 104.

It should be noted that, preferably, an image of the current page is displayed so that the designated image alignment position is disposed near a position corresponding to the image alignment position of the user interface screen of the image processing application 101. For example, if "upper right" is designated as the image alignment position, then preferably the upper right corner portion of every page, which is the alignment position of every page, is displayed near the upper right corner of the user interface screen. Such a disposition arises because there is no need for a margin on the right, left, top or bottom of the user interface screen if the reference position (the image alignment position) is the right, left, top or bottom, respectively, but there is a need for a margin on the side relative to the reference position. In addition, if the center is designated the reference position, then a margin is required on both sides thereof, and consequently, it is preferable that the reference position be disposed near the center of the user interface screen.

It should be noted that, in the flow charts shown in the present embodiment, the order of the processes shown therein may be changed as long as the processes are not incomplete.

Figure 23:
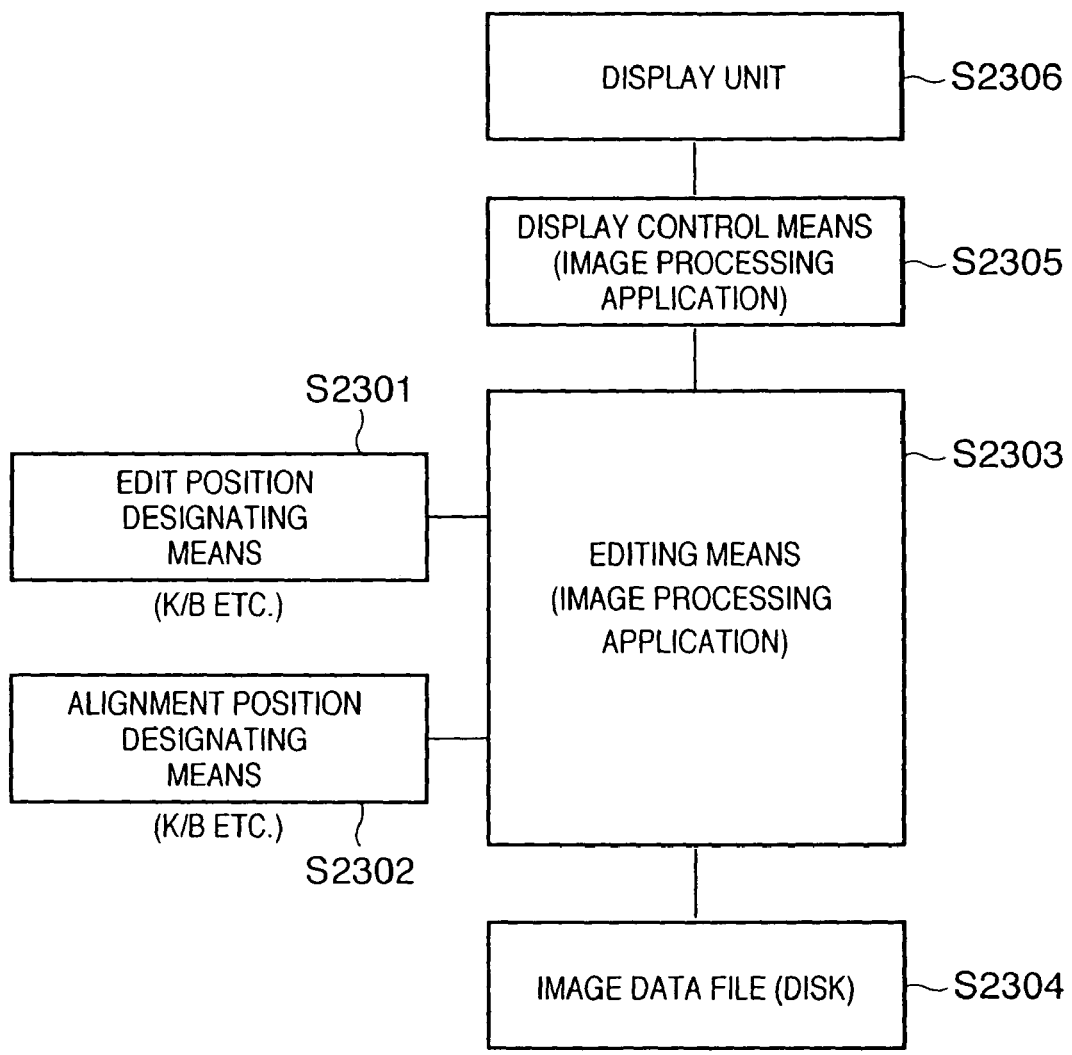
FIG. 23 is a functional block diagram of an image processing apparatus that enables identical retouching of a plurality of retouch target images.

FIG. 23 is a functional block diagram of an image processing apparatus that enables identical retouching of a plurality of retouch target images according to the present invention. The host computer 100 shown in FIG. 2 implements the functional blocks shown in FIG. 23. In FIG. 23, the image data targeted for retouching is saved in an image data file 2304, and retouched image data also is returned to the image data file 2304. The user can designate a retouch position that is the target of retouching for a single image using a retouch position designating means 2301. In addition, the user can designate an image alignment position using an alignment position designating means 2302. These designating means may be implemented, for example, by inputting retouch positions and alignment positions at a designation screen displayed by the user interface using the keyboard and pointing device shown in FIG. 2. In addition, a retouching means 2303 aligns the retouch target image at the designated alignment position and retouches a designated area of the aforementioned single image using the designated retouch position as a reference. This operation is implemented by the CPU 201 executing the image processing application of the present embodiment. In particular, the procedure shown in FIG. 21 is the equivalent of the retouching means 2303. In addition, a display control means 2305 aligns and displays the retouch target image on the display screen at the alignment position as well as displays the designated area, which has as its reference the retouch position for the single image, so as to be identifiable. The display control means 2305 is implemented by the CPU 201 executing the image processing application of the present embodiment. In particular, the procedure shown in FIG. 13 is the equivalent of the display control means 2305. User interface screen like those shown in FIGS. 4, 7, 8 and 14-20 are displayed on a display unit 2306. In particular, as shown in FIG. 16B, images of different sizes are aligned using the alignment position as a reference and displayed by the display control means 2305.

By following the procedures for image processing of the present embodiment, in an image editing application that enables a plurality of image data to be retouched at once with a single instruction, it is possible to retouch multiple images of different document sizes as well in a single operation.

In addition, the retouch position for a document to be retouched can be confirmed while sequentially paging forward with the retouch position displayed as is.

Further still, when paging forward and confirming the retouch position of a document to be retouched, the retouch position for the document to be retouched can be confirmed easily while determining the display position of the image so that the retouch position is not changed on the display screen and sequentially paging forward looking only at the retouch position even if a paper alignment position is designated.

(Other Embodiments)

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by a interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (WorldWideWeb) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-122289 filed Apr. 16, 2004, which is hereby incorporated by reference herein.

What is claimed is:

1. An information processing apparatus for editing an image, comprising:
   a first selection unit adapted to select display images to be displayed from among a plurality of images of different sizes;
   a display control unit adapted to display images selected by said first selection unit;
   a second selection unit adapted to select images to be edited from among the plurality of images of different sizes;
   a position selection unit configured to select an alignment position on which the edit images of different sizes selected by said second selection unit are aligned from among a plurality of candidate alignment positions;
   an alignment unit adapted to align edit images of different sizes selected by said second selection unit in the alignment position selected by said position selection unit;
   a designation unit adapted to designate an edit area to be edited, wherein said edit area is defined in coordinates with their origin at the alignment position selected by said position selection unit;
   an editing unit adapted to edit a drawn content within the edit area of the display images displayed by said display control unit; and
   an applying unit adapted to apply editing by said editing unit to a drawn content within the edit area of each of the edit images of different sizes,
   wherein the edit images of different sizes are aligned in the alignment position.

2. The apparatus according to claim 1, wherein said display control unit displays a plurality of thumbnail-size images in a thumbnail pane and the edit images of different sizes in an edit pane;
   wherein the edit images of different sizes selected by said second selection unit is displayed in the thumbnail pane identifiably among images displayed in the thumbnail pane.

3. The apparatus according to claim 2, further comprising a changing unit adapted to change an image displayed in the edit pane;
   wherein said displaying unit displays only the edit images of different sizes in the edit pane in accordance with a changing operation by said changing unit.

4. An information processing method for editing an image, comprising:
   a first selection step of selecting display images to be displayed from among a plurality of images of different sizes;
   a display control step of displaying images selected by said first selection step;
   a second selection step of selecting edit images to be edited from among the plurality of images of different sizes;
   a position selection step of selecting an alignment position on which the edit images of different sizes selected in the second selection unit are aligned from among a plurality of candidate alignment positions;
   an alignment step, using an information processing apparatus, of aligning edit images of different sizes selected in said second selection step in the alignment position selected in the position selection step;
   a designation step of designating an edit area to be edited, wherein said edit area is defined in coordinates with their origin at the alignment position selected in the position selection step;
   an editing step of editing a drawn content within the edit area of the display images displayed by said display control step; and
   an applying step, using the information processing apparatus, of applying editing by said editing step to a drawn content within the edit area of the edit image of different sizes,
   wherein the edit images of different sizes are aligned in the alignment position.

5. The method according to claim 4, wherein said display control step displays a plurality of thumbnail-size images in a thumbnail pane and the edit images of different sizes in an edit pane,
   wherein the edit images of different sizes selected by said second selection step are displayed in the thumbnail pane identifiably among images displayed in the thumbnail pane.

6. The method according to claim 5, further comprising a changing step of changing an image displayed in the edit pane,
   wherein said displaying step displays only the edit images of different sizes in the edit pane in accordance with a changing operation by said changing step.

7. A non-transitory computer-readable medium having a program stored thereon wherein said program is executable by a computer to perform steps comprising:
   a first selection step of selecting display images to be displayed from among a plurality of images of different sizes;
   a display control step of displaying images selected by said first selection step;
   a second selection step of selecting edit images to be edited from among the plurality of images of different sizes;
   a position selection step of selecting an alignment position on which the edit images of different sizes selected in the second selection unit are aligned from among a plurality of candidate alignment positions;
   an alignment step of aligning edit images of different sizes selected in said second selection step in the alignment position selected in the position selection step;

a designation step of designating an edit area to be edited, wherein said edit area is defined in coordinates with their origin at the alignment position selected in the position selection step;

an editing step of editing a drawn content within the edit area of the display image displayed by said display control step; and an applying step of applying editing by said editing step to a drawn content within the edit area of the edit images of different sizes, wherein the edit images of different sizes are aligned in the alignment position.

8. A computer-readable medium according to claim 7, wherein said display control step displays a plurality of thumbnail-size images in a thumbnail pane and the edit images of different sizes in an edit pane;

wherein the edit images of different sizes selected by said second selection step is displayed in the thumbnail pane identifiably among images displayed in the thumbnail pane.

9. The apparatus according to claim 8, further comprising a changing step of changing an image displayed in the edit pane;

wherein said displaying step displays only the edit images of different sizes in the edit pane in accordance with a changing operation by said changing step.

* * * * *